US012353145B2

(12) United States Patent
Ariizumi

(10) Patent No.: US 12,353,145 B2
(45) Date of Patent: Jul. 8, 2025

(54) DEVELOPING DEVICE

(71) Applicant: CANON KABUSHIKI KAISHA, Tokyo (JP)

(72) Inventor: Osamu Ariizumi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/419,775

(22) Filed: Jan. 23, 2024

(65) Prior Publication Data

US 2024/0272565 A1 Aug. 15, 2024

(30) Foreign Application Priority Data

Feb. 13, 2023 (JP) ................................ 2023-020079
Jan. 12, 2024 (JP) ................................ 2024-003032

(51) Int. Cl.
*G03G 15/09* (2006.01)
*G03G 15/08* (2006.01)

(52) U.S. Cl.
CPC ..... *G03G 15/0818* (2013.01); *G03G 15/0808* (2013.01); *G03G 15/0868* (2013.01); *G03G 15/0921* (2013.01)

(58) Field of Classification Search
CPC ................................................ G03G 15/0921
See application file for complete search history.

(56) References Cited

U.S. PATENT DOCUMENTS 5,987,288 A * 11/1999 Mori ...................... G03G 15/06 399/272
11,852,989 B2 12/2023 Ariizumi
2007/0053725 A1* 3/2007 Sakamaki .......... G03G 15/0921 399/269
2008/0181679 A1* 7/2008 Sakamaki .......... G03G 15/0896 399/286
2013/0330107 A1 12/2013 Itagaki et al.
2014/0140739 A1* 5/2014 Sato .................. G03G 15/0921 399/269
2015/0268586 A1* 9/2015 Sakamaki .......... G03G 15/0921 399/269
2016/0091830 A1* 3/2016 Furukawa .......... G03G 15/0921 399/104

(Continued)

FOREIGN PATENT DOCUMENTS

JP H11327308 A * 11/1999
JP 2007072221 A * 3/2007 ......... G03G 15/0921

(Continued)

*Primary Examiner* — Sevan A Aydin
(74) *Attorney, Agent, or Firm* — VENABLE LLP

(57) ABSTRACT

A developing device includes a first rotatable member having a rotation center Q and a second rotatable member having a rotation center R. When a rectilinear line connecting the rotation center Q and an intersection point X is a rectilinear line L4, a rectilinear line connecting the rotation center Q and a magnetic flux density peak position Y is a rectilinear line L5, a rectilinear line connecting the rotation center Q and a magnetic flux density peak position Z is a rectilinear line L6, an acute angle formed between the rectilinear line L4 and the rectilinear line L5 is $\alpha$ [°], and an acute angle formed between the rectilinear line L4 and the rectilinear line L6 is $\beta$ [°], $\alpha > \beta$ is satisfied.

9 Claims, 17 Drawing Sheets

(56) References Cited

U.S. PATENT DOCUMENTS

2017/0357188 A1 * 12/2017 Ishizuka ............ G03G 21/1647
2019/0332034 A1 10/2019 Okamura et al.

FOREIGN PATENT DOCUMENTS

JP 2009-156975 A 7/2009
JP 2013-254107 A 12/2013
JP 2015161712 A * 9/2015
JP 2017-167376 A 9/2017
JP 2019-191485 A 10/2019

* cited by examiner

MAGNETIC PROPERTY

DEVELOPING DEVICE

FIELD OF THE INVENTION AND RELATED ART

The present invention relates to a developing device for developing an electrostatic latent image, formed on an image bearing member, with a developer.

As the developing device, a constitution in which two developing rollers for developing the electrostatic latent image, formed on the image bearing member, with the developer are arranged side by side is proposed (Japanese Laid-Open Patent Application (JP-A) No. 2013-254107). The developing device disclosed in JP-A 2013-254107, of the two developing rollers, to a first developing roller positioned at a lower portion in the vertical direction, the developer is supplied from a supplying portion, and to a second developing roller positioned at an upper portion in the vertical direction, the developer is delivered from the first developing roller positioned at the lower portion. Then, the developer is peeled off from the second developing roller positioned at the upper portion and then is collected.

In the case of including two developing rollers as in the constitution disclosed in JP-A 2013-254107, in a step in which the developer is peeled off from the second developing roller, all the developer on the second drop is not peeled off from the second developing roller, but a part of the developer carried on the second developing roller remains on the second developing roller as it is. Then, the remaining developer is conveyed on the second developing roller, and thereafter is dropped on the first developing roller positioned immediately below the second developing roller.

The developer dropped on the first developing roller is a used developer which is used in a developing step by the first developing roller and the second developing roller, and an amount of toner in the developer becomes smaller than an amount of normal toner existing in the supplying portion.

When such a used developer is dropped on the first developing roller, there is a liability that the developer enters a developer delivering portion positioned in the neighborhood of a closest position between the first developing roller and the second developing roller by the influence of a magnetic force on the first developing roller. When the used developer is delivered again to the second developing roller at the developer delivering portion between the first developing roller and the second developing roller, the developer on the second developing roller becomes a mixture of the normal developer and the used developer in which the amount of the toner is small, and therefore, non-uniformity in amount of the toner moving to the image bearing member when the electrostatic latent image on the image bearing member is developed with the developer occurs, so that density unevenness occurs on a final output image. This phenomenon is referred to as a so-called co-rotation (drag) phenomenon.

Further, in the case such that the used developer becomes aggregate after the developing step of the second developing roller is ended, a so-called developer clogging phenomenon such that the aggregate of the developer clogs in the neighborhood of a closest position between the first developing roller and the second developing roller occurs, so that a stripe-shaped image is generated on a final output image.

Thus, in the developing device including the two developing rollers as disclosed in JP-A 2013-254107, there is a liability that an image defect such as the density unevenness or a stripe-shaped image defect is liable to occur on the output image. Particularly, in a use condition such that an image forming apparatus is operated at a high speed, the above-described problem is liable to occur by the influence of temperature rise in the developing device.

SUMMARY OF THE INVENTION

A principal object of the present invention is to provide a developing device capable of suppressing an occurrence of an image defect.

According to an aspect of the present invention, there is provided a developing device comprising: a first chamber configured to accommodate a developer containing toner and a carrier; a first feeding screw provided in the first chamber and configured to feed the developer in the first chamber; a first rotatable member to which the developer is supplied from the first chamber and configured to carry and feed the developer for developing an electrostatic latent image formed on an image bearing member; a first magnet fixedly provided inside the first rotatable member and including a first magnetic pole and a second magnetic pole which is provided downstream of and adjacent to the first magnetic pole in a rotational direction of the first rotatable member and which has the same polarity as the first magnetic pole; a second rotatable member which is provided opposed to the first rotatable member, to which the developer is delivered from the first rotatable member by a magnetic field generated by the first magnet, and which is configured to carry and feed the developer for developing the electrostatic latent image, the second rotatable member having a rotation center R positioned above a rotation center Q of the first rotatable member in a vertical direction; a second magnet fixedly provided inside the second rotatable member and including a third magnetic pole which is provided opposed to the first magnetic pole and which is different in polarity from the first magnetic pole; a second chamber which is partitioned from the first chamber by a partition wall and in which the developer after the electrostatic latent image is developed with the developer is collected; and a second feeding screw provided in the second chamber and configured to feed the developer in the second chamber, the second feeding screw having a rotation center positioned above a rotation center of the first feeding screw in the vertical direction, wherein in a case that a point where a horizontal line L2 passing through the rotation center R of the second rotatable member and an outer peripheral surface of the second rotatable member intersect with each other and which is positioned on a side opposite from the image bearing member with respect to the rotation center R of the second rotatable member is a point P, a point where a vertical line passing through the point P and an outer peripheral surface of the first rotatable member intersect with each other and which is positioned above the rotation center Q of the first rotatable member in the vertical direction is a point X, a position where a magnetic flux density of the first magnetic pole in the normal direction relative to the outer peripheral surface of the first rotatable member becomes a peak is a point Y, and a position where a magnetic flux density of the second magnetic pole in the normal direction relative to the outer peripheral surface of the first rotatable member becomes a peak is a point Z, the point X is positioned downstream of the point Y and upstream of the point Z in the rotational direction of the first rotatable member, and wherein in a case that a rectilinear line connecting the rotation center Q of the first rotatable member and the point X is a rectilinear line L4, a rectilinear line connecting the rotation center Q of the first rotatable member and the point Y is a rectilinear line L5, a rectilinear line connecting the rotation center Q of the first rotatable member and the point Z is a rectilinear line L6, an acute angle formed between the rectilinear lines L4 and L5 is α [°], and an acute angle formed between the rectilinear lines L4 and L6 is β [°], α>β is satisfied.

According to another aspect of the present invention, there is provided a developing device comprising: a first chamber configured to accommodate a developer containing toner and a carrier; a first feeding screw provided in the first chamber and configured to feed the developer in the first chamber; a first rotatable member to which the developer is supplied from the first chamber and configured to carry and feed the developer for developing an electrostatic latent image formed on an image bearing member; a first magnet fixedly provided inside the first rotatable member and including a first magnetic pole and a second magnetic pole which is provided downstream of and adjacent to the first magnetic pole in a rotational direction of the first rotatable member and which is different in polarity from the first magnetic pole; a second rotatable member which is provided opposed to the first rotatable member, to which the developer is delivered from the first rotatable member by a magnetic field generated by the first magnet, and which is configured to carry and feed the developer for developing the electrostatic latent image, the second rotatable member having a rotation center R positioned above a rotation center Q of the first rotatable member in a vertical direction; a second magnet fixedly provided inside the second rotatable member and including a third magnetic pole which is provided opposed to the first magnetic pole and which is different in polarity from the first magnetic pole; a second chamber which is partitioned from the first chamber by a partition wall and in which the developer after the electrostatic latent image is developed with the developer is collected; and a second feeding screw provided in the second chamber and configured to feed the developer in the second chamber, the second feeding screw having a rotation center positioned above a rotation center of the first feeding screw in the vertical direction, wherein in a case that a point where a horizontal line L2 passing through the rotation center R of the second rotatable member and an outer peripheral surface of the second rotatable member intersect with each other and which is positioned on a side opposite from the image bearing member with respect to the rotation center R of the second rotatable member is a point P, a point where a vertical line passing through the point P and an outer peripheral surface of the first rotatable member intersect with each other and which is positioned above the rotation center Q of the first rotatable member in the vertical direction is a point X, a position where a magnetic flux density of the first magnetic pole in the normal direction relative to the outer peripheral surface of the first rotatable member becomes a peak is a point Y, and a position where a magnetic flux density of the second magnetic pole in the normal direction relative to the outer peripheral surface of the first rotatable member becomes a peak is a point Z, the point X is positioned downstream of the point Y and upstream of the point Z in the rotational direction of the first rotatable member, and wherein in a case that a rectilinear line connecting the rotation center Q of the first rotatable member and the point X is a rectilinear line L4, a rectilinear line connecting the rotation center Q of the first rotatable member and the point Y is a rectilinear line L5, a rectilinear line connecting the rotation center Q of the first rotatable member and the point Z is a rectilinear line L6, an acute angle formed between the rectilinear lines L4 and L5 is α [°], and an acute angle formed between the rectilinear lines L4 and L6 is β[°], α>β is satisfied.

Further features of the present invention will become apparent from the following description of exemplary embodiments with reference to the attached drawings.

DESCRIPTION OF THE EMBODIMENTS

First Embodiment

A first embodiment will be described using FIGS. 1 to 11. First, a general structure of an image forming apparatus in the embodiment will be described with reference to FIG. 1.

[Image Forming Apparatus]

Figure 1:
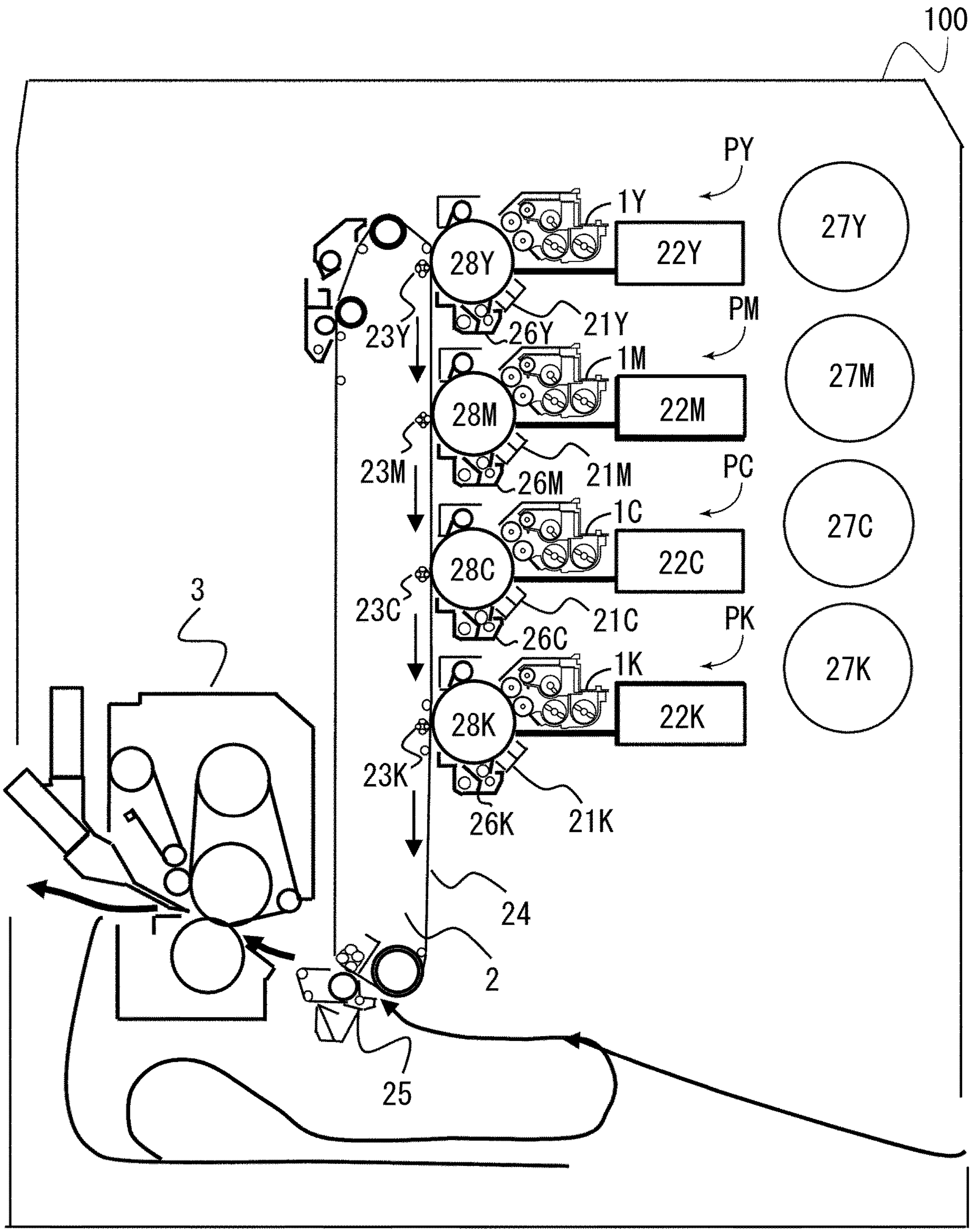
FIG. 1 is a schematic sectional view of an image forming apparatus according to a first embodiment.

An image forming apparatus 100 is a full-color image forming apparatus, and in the case of this embodiment, the image forming apparatus 100 is, for example, an MFP (multi-function peripheral) having a copy function, a printer function, and a scan function. The image forming apparatus 100 includes, as shown in FIG. 1, image forming portions PY, PM, PC, and PK for performing an image forming step of forming toner images of four colors of yellow, magenta, cyan, and black, respectively, which are juxtaposed.

The image forming portions PY, PM, PC, and PK for the respective colors include primary chargers 21Y, 21M, 21C, and 21K, developing devices 1Y, 1M, 1C, and 1K, optical write portions (exposure devices) 22Y, 22M, 22C, and 22K, photosensitive drums 28Y, 28M, 28C, and 28K, and a cleaning devices 26Y, 26M, 26C, and 26K, respectively. Further, the image forming apparatus 100 includes a transfer device 2 and a fixing device 3. Structures of the image forming portions PY, PM, PC, and PK are similar to each other, and therefore, in the following, description will be described using the image forming portion PY as a representative.

The photosensitive drum 28Y as an image bearing member is a photosensitive member, having a photosensitive layer formed of a resin such as polycarbonate, containing an organic photoconductor (OPC), and is constituted so as to be rotated at a predetermined speed. The primary charger 21Y includes a corona discharge pole disposed at a periphery of the photosensitive drum 28Y and electrically charges a surface of the photosensitive drum 28Y by generated ions.

In the optical write portion 22Y, a scanning optical device is assembled, and by exposing the charged photosensitive drum 28Y to light on the basis of image data, a potential of an exposed portion is lowered, so that a charge pattern (electrostatic latent image) corresponding to the image data is formed. The developing device 1Y develops the electrostatic latent image, formed on the photosensitive drum 28Y, by transferring a developer accommodated therein onto the photosensitive drum 28Y. The developer is prepared by mixing a carrier with toner of an associated color, and the electrostatic latent image is visualized (developed) with the toner.

The transfer device 2 includes primary transfer rollers 23Y, 23M, 23C, and 23K, an intermediary transfer belt 24, and a secondary transfer roller 25. The intermediary transfer belt 24 is wound around the primary transfer rollers 23Y, 23M, 23C, and 23K and a plurality of rollers, and is supported so as to be travelable.

The primary transfer rollers 23Y, 23M, 23C, and 23K are disposed in a named order from above in FIG. 1 and correspond to the colors of Y (yellow), M (magenta), C (cyan), and K (black), respectively. The secondary transfer roller 25 is disposed outside the intermediary transfer belt 24 and is constituted so that a recording material is capable of passing, through the belt, the secondary transfer roller 25 and the intermediary transfer belt 24. The recording material is a sheet such as a form (paper) or a plastic sheet.

The toner images of the respective colors formed on the photosensitive drums 28Y, 28M, 28C, and 28K are successively transferred onto the intermediary transfer belt 24 by the primary transfer rollers 23Y, 23M, 23C, and 23K, respectively, so that a color toner image including superimposed layers of the colors of yellow, magenta, cyan, and black is formed. The thus-formed toner image is transferred by the secondary transfer roller 25 onto the recording material fed from a cassette in which recording materials are accommodated. The recording material on which the toner image is transferred is pressed and heated in the fixing device 3. By this, the toner on the recording material is melted, so that the color image is fixed on the recording material.

Developer storage portions 27Y, 27M, 27C, and 27K are provided correspondingly to the developing devices 1Y, 1M, 1C, and 1K, respectively, and in which bottles accommodating developers corresponding to the colors of yellow, magenta, cyan, and black are exchangeably mounted in a named order from above, respectively. The developer storage portions 27Y, 27M, 27C, and 27K are constituted so that the developers are capable of being fed (supplied) therefrom to the developing devices 1Y, 1M, 1C, and 1K corresponding to the colors of the developers stored therein, respectively.

For example, a toner weight ratio of the developer accommodated in each bottle is 80 to 95%, and a toner weight ratio of the developer in each of the developing devices 1Y, 1M, 1C, and 1K is 5 to 10%. For that reason, when the toner is consumed by development in each of the developing devices 1Y, 1M, 1C, and 1K, the developer containing the toner in an amount corresponding to a consumption amount of the toner is supplied, so that the toner weight ratio of the developer in each of the developing devices 1Y, 1M, 1C, and 1K is maintained in a constant amount.

[Developing Device]

Next, the photosensitive drums 1Y, 1M, 1C, and 1K will be specifically described using FIGS. 2 to 5.

Figure 2:
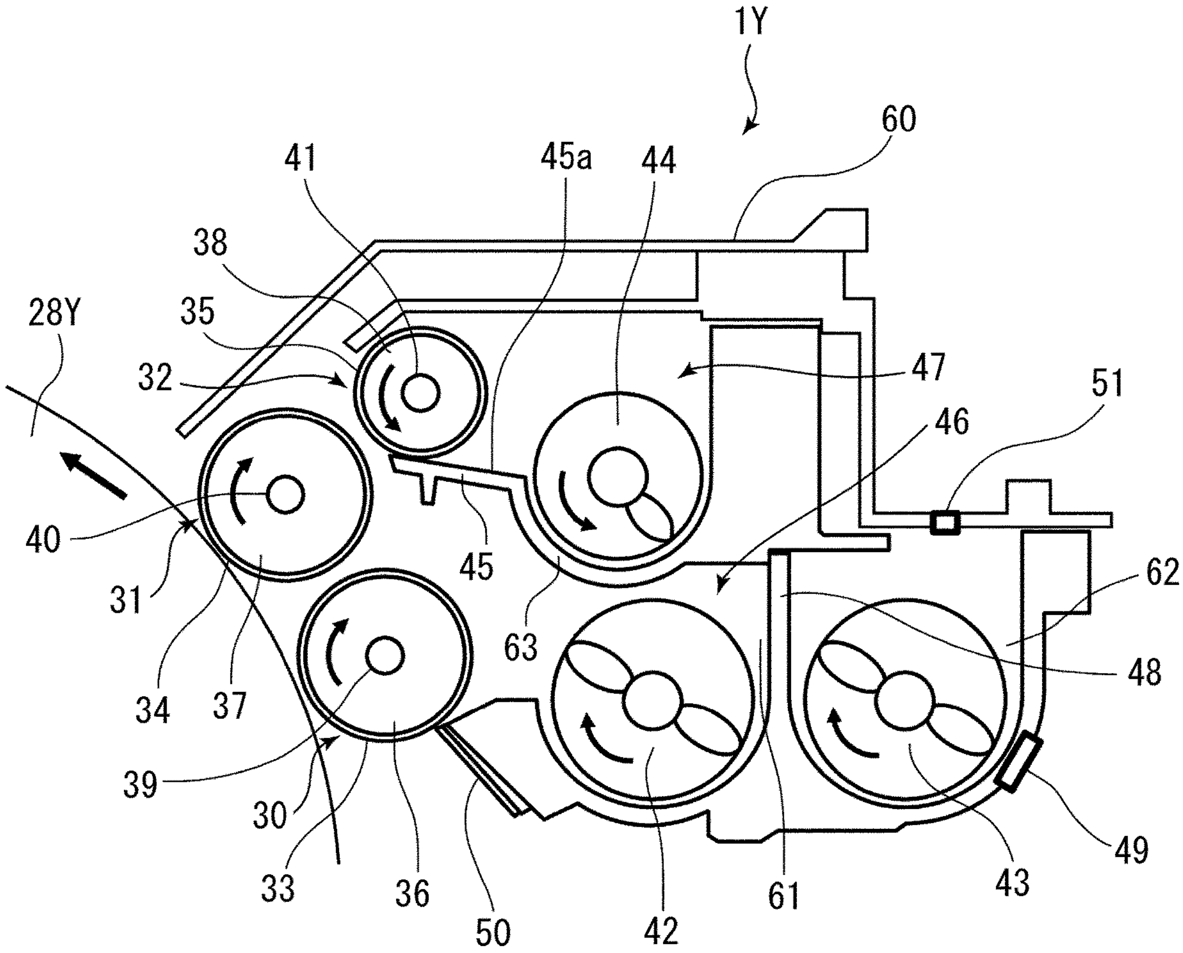
FIG. 2 is a schematic sectional view of a developing device according to the first embodiment.

Structures of the developing devices 1Y, 1M, 1C, and 1K are the same, and therefore, in the following, the developing device 1Y will be described as a representative. FIG. 2 is a conceptual view illustrating the developing device 1Y shown in FIG. 1, and FIGS. 3 to 5 are conceptual views illustrating magnetic pole structures of a first magnet 36, a second magnet 37, and a third magnet 38 which are provided inside the developing device 1Y, respectively.

The developing device 1Y includes, as shown in FIG. 2, a first developing roller 30, a second developing roller 31, a peeling roller 32, a developer supplying screw 42, a developer stirring screw 43, and a developer collecting screw 44, and these members are accommodated in a developing container 60.

The first developing roller 30 is a developer carrying member which is rotationally driven, and is provided at a position adjacent to the photosensitive drum 28Y so that a rotational axis thereof is substantially parallel to a rotational axis of the photosensitive drum 28Y. The first developing roller 30 includes a first sleeve 33 which is rotatable, and the first magnet (fixed magnet) 36 non-rotationally provided inside the first sleeve 33 and for attracting the developer to a surface of the first sleeve 33 by a magnetic force. Then, the first developing roller 30 attracts (carries) the developer, scooped from the developer supplying screw 42, on the basis of the magnetic force, and develops the electrostatic latent image formed on the rotating photosensitive drum 28Y (image bearing member), with the developer.

The first sleeve 33 is a non-magnetic cylindrical member and is rotationally driven about a rotation shaft 39. A rotational direction of the first sleeve 33 is the clockwise direction as indicated by an arrow in FIG. 2 and is a direction opposite to a rotational direction of the photosensitive drum 28. For this reason, the first sleeve 33 and the photosensitive drum 28Y rotate in the same direction at mutually opposing positions.

Figure 3:
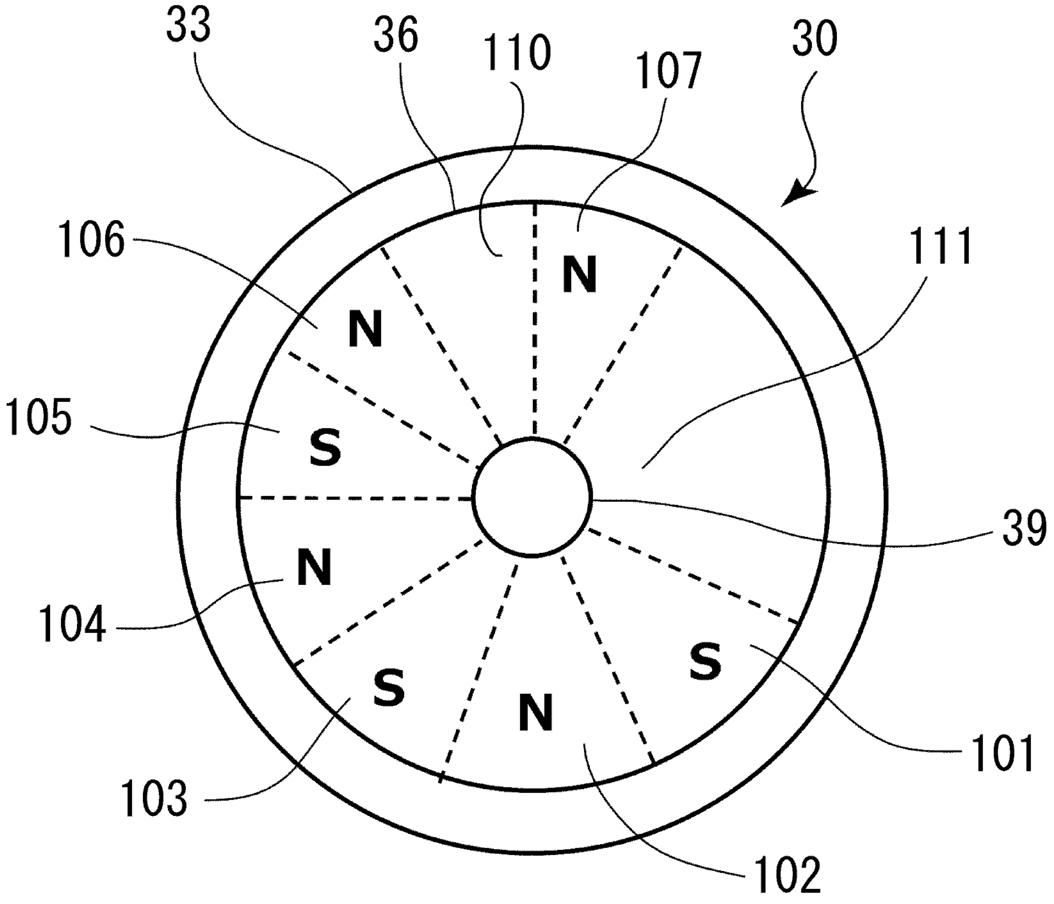
FIG. 3 is a schematic view showing a magnetic pole arrangement of a first developing roller in the first embodiment.

The first magnet 36 is disposed inside the first sleeve 33 and includes, as shown in FIG. 3, a plurality of sector magnetic poles 101 to 107, repelling magnetic field region 110, and a sector spacer 111. Between an inner periphery of the first sleeve 33 and an outer periphery of the first magnet 36, a space permitting rotation of the first sleeve 33 is provided.

The developer attracted onto the first sleeve 33 is conveyed toward the photosensitive drum 28Y by a rotation operation of the first sleeve 33, so that the electrostatic latent image formed on the photosensitive drum 28Y is developed with the developer. After the electrostatic latent image formed on the photosensitive drum 28Y is developed with the developer, the developer on the first sleeve 33 is conveyed to the neighborhood of the second developing roller 31 by a rotation operation of the first sleeve 33. Then, in the neighborhood of a closest position between the first developing roller 30 and the second developing roller 31, the developer is peeled off from the first sleeve 33 and then delivered to a surface of a second sleeve 34 by a magnetic field generated by the first magnet 36 included in the first developing roller 30 and by the second magnet 37 included in the second developing roller 31.

The second developing roller 31 is a developer carrying member which is rotationally driven, and is provided downstream of the first developing roller 30 with respect to the rotational direction of the photosensitive drum 28Y and above a rotation center of the first developing roller 30 with respect to the vertical direction. To the second developing roller 31, the developer is delivered from the first developing roller 30 by the magnetic force. The second developing roller 31 is, similarly as the first developing roller 30, provided at a position adjacent to the photosensitive drum 28Y so that a rotational axis thereof is substantially parallel to a rotational axis of the photosensitive drum 28Y. Accordingly, the second developing roller 31 and the first developing roller 30 are substantially parallel to each other in rotational axis.

Such a second developing roller 31 includes a second sleeve 34 which is rotatable, and the second magnet (fixed magnet) 37 non-rotationally provided inside the second sleeve 34 and for attracting the developer to a surface of the second sleeve 34 by a magnetic force. Then, on the basis of the magnetic force, to the second developing roller 31, the developer is delivered from the first developing roller 30 (the first sleeve 33), and the second developing roller 31 attracts (carries) the developer, and develops the electrostatic latent image formed on the rotating photosensitive drum 28Y, with the developer. On a side of the second developing roller 31, the peeling roller 32 described later is positioned.

The second sleeve 34 is a non-magnetic cylindrical member and is rotationally driven about a rotation shaft 40. A rotational direction of the second sleeve 34 is the clockwise direction as indicated by an arrow in FIG. 2 and is a direction opposite to a rotational direction of the photosensitive drum 28. For this reason, the second sleeve 34 and the photosensitive drum 28Y rotate in the same direction at mutually opposing positions. Further, the first sleeve 33 and the second sleeve 34 rotate in opposite directions at mutually opposing positions.

Figure 4:
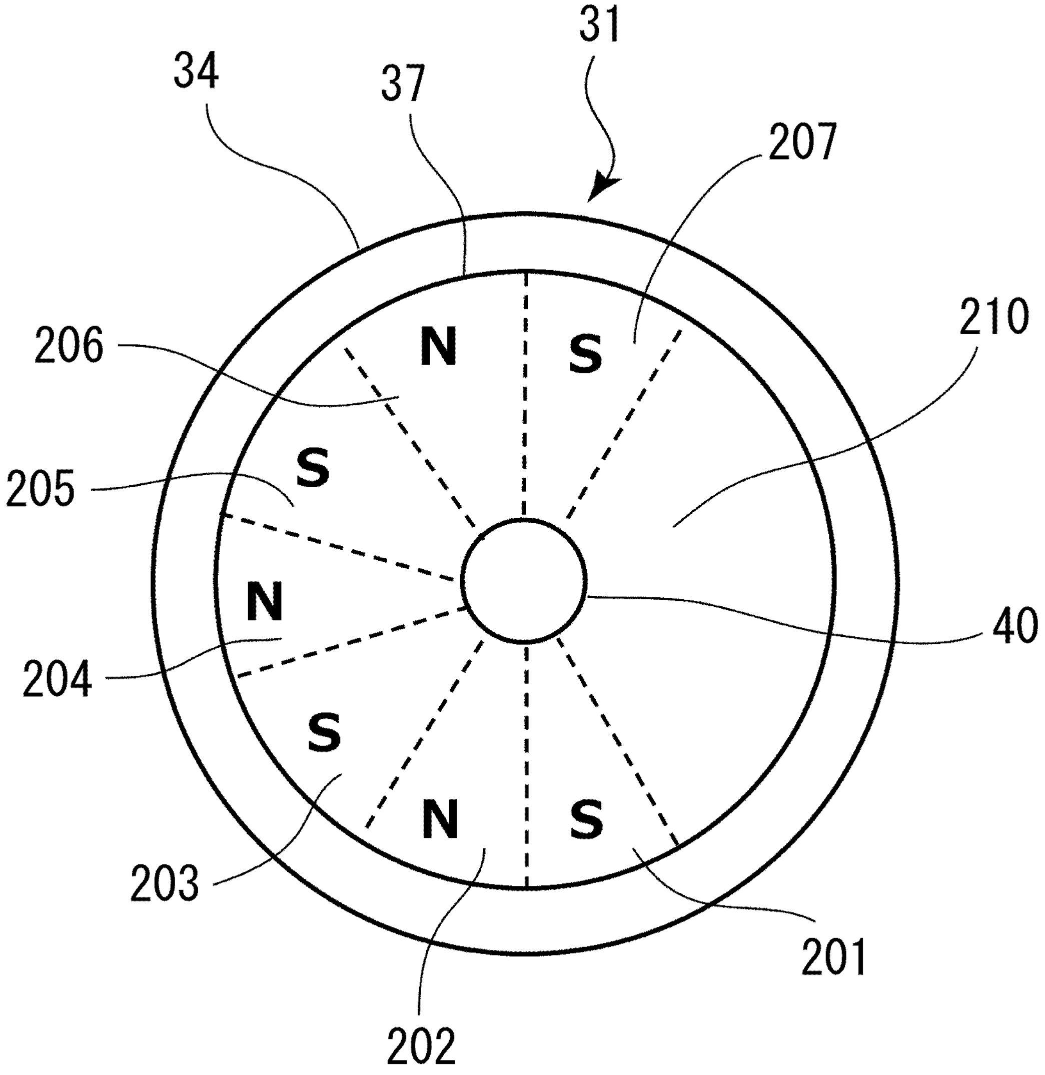
FIG. 4 is a schematic view showing a magnetic pole arrangement of a second developing roller in the first embodiment.

The second magnet 37 is disposed inside the second sleeve 34 and includes, as shown in FIG. 4, a plurality of sector magnetic poles 201 to 207 and a repelling magnetic field region 210. Between an inner periphery of the second sleeve 34 and an outer periphery of the second magnet 37, a space permitting rotation of the second sleeve 34 is provided.

The developer attracted onto the second sleeve 34 is conveyed toward the photosensitive drum 28Y by a rotation operation of the second sleeve 34, so that the electrostatic latent image formed on the photosensitive drum 28Y is developed with the developer. After the electrostatic latent image formed on the photosensitive drum 28Y is developed with the developer, the developer remaining on the second sleeve 34 is conveyed to the neighborhood of the peeling roller 32 by a rotation operation of the second sleeve 34. Then, in the neighborhood of a closest position between the second developing roller 31 and the peeling roller 32, the developer is delivered from the second sleeve 34 to a third sleeve 35 of the peeling roller 32 by a magnetic field generated by the second magnet 37 included in the second developing roller 31 and by the third magnet 38 included in the peeling roller 32.

The peeling roller 32 as a peeling portion is provided on a side opposite from the photosensitive drum 28Y with respect to a rotation center R (see FIG. 6 described later) of the second sleeve 34 and peels off, from the second developing roller 31, the developer after the electrostatic latent image on the photosensitive drum 28Y is developed by the second developing roller 31. Specifically, the peeling roller 32 is a developer carrying member which is rotationally driven, and is provided between the second developing roller 31 and the developer collecting screw 44 so that a rotation center thereof is positioned above the rotation center R of the second developing roller 31.

Further, the peeling roller 32 is disposed so that a rotational axis thereof is substantially parallel to a rotational axis of the second developing roller 31. Such a peeling roller 32 includes a third sleeve 35 which is rotatable, and the third magnet (fixed magnet) 38 non-rotationally provided inside the third sleeve 35 and for attracting the developer to a surface of the third sleeve 35 by a magnetic force, and is constituted so that the developer is delivered from the second developing roller 31 thereto on the basis of the magnetic force.

The third sleeve 35 is a non-magnetic cylindrical member and is rotationally driven about a rotation shaft 41. A rotational direction of the third sleeve 35 is the counterclockwise direction as indicated by an arrow in FIG. 2 and is a direction opposite to a rotational direction of the second sleeve 34. For this reason, the third sleeve 35 and the second sleeve 34 rotate in the same direction at mutually opposing positions.

Figure 5:
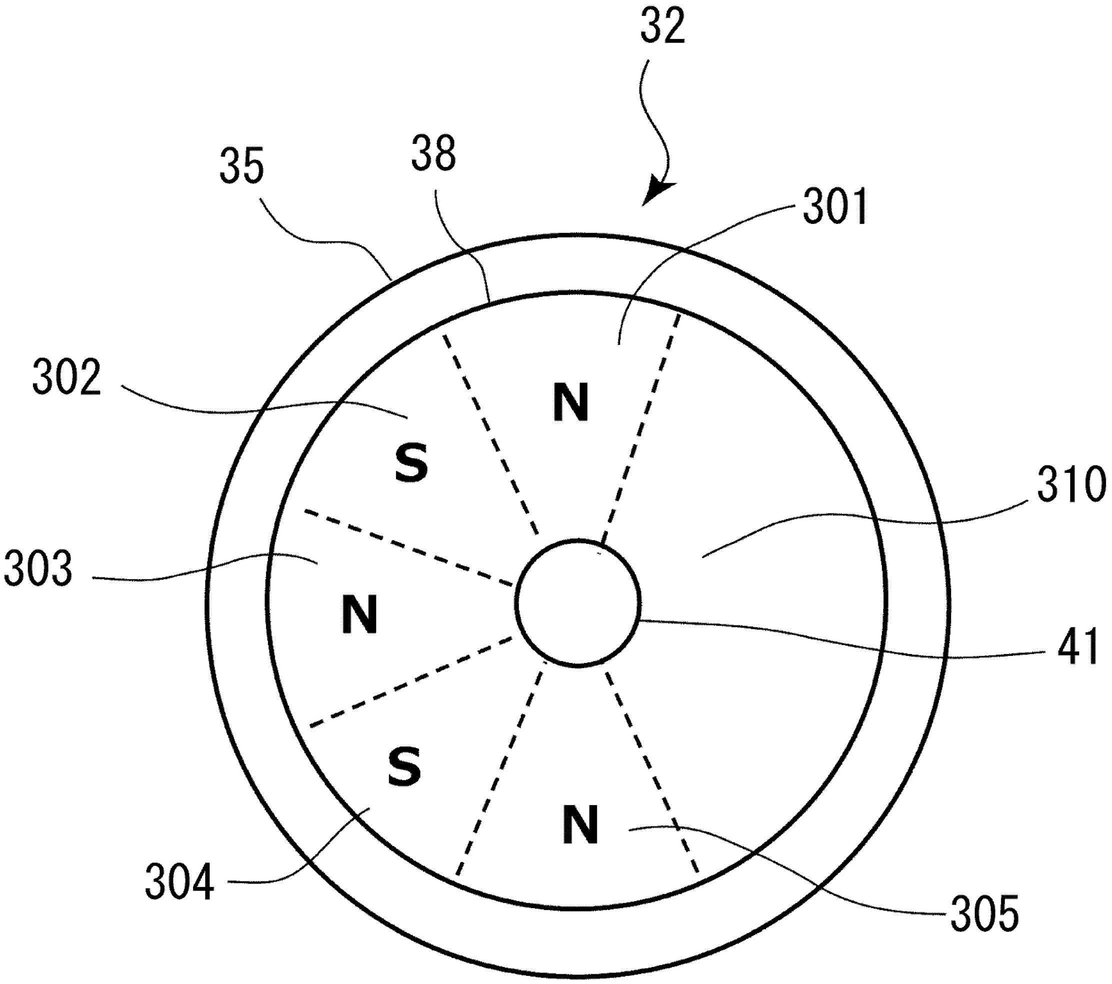
FIG. 5 is a schematic view showing a magnetic pole arrangement of a peeling roller in the first embodiment.

The third magnet 38 is disposed inside the third sleeve 35 and includes, as shown in FIG. 5, a plurality of sector magnetic poles 301 to 305 and a repelling magnetic field region 310. Between an inner periphery of the third sleeve 35 and an outer periphery of the third magnet 38, a space permitting rotation of the third sleeve 35 is provided.

The developer attracted to the third sleeve 35 is conveyed to a downstream side of the rotational direction by a rotation operation of the third sleeve 35 and is peeled off from the third sleeve 35 at a position close to the developer collecting screw 44 by the third magnet 38 included in the peeling roller 32, so that the developer is dropped toward a guiding member 45 positioned below with respect to the vertical direction, by a self-weight thereof. Then, the developer dropped on the guiding member 45 is guided toward the developer collecting screw 44 by its own weight.

The guiding member 45 and the developer collecting screw 44 constitute a developer collecting portion 47 as a collecting portion for collecting the developer peeled off from the third sleeve 35 on the peeling roller 32. In the developer collecting portion 47, the developer collecting screw 44 is positioned below a rotation center of the peeling roller 32 in the vertical direction, and conveys the developer delivered (collected) from the peeling roller 32, while stirring the developer.

The guiding member 45 as a guiding portion is disposed below the rotation center of the peeling roller 32 with respect to the vertical direction, and guides the developer, peeled off by the peeling roller 32, toward the developer collecting screw 44. Such a guiding member 45 is provided with an inclined surface 45*a* along which the developer slides down by its own weight in order to reliably guide the peeled developer toward the developer collecting screw 44. The inclined surface 45*a* is inclined with respect to a horizontal direction so that a position thereof on the developer collecting screw 44 side is lower than a lower position of the peeling roller 32.

The developer collecting screw 44 as a collecting portion and a conveying (feeding) portion conveys the collected developer to a developer circulating portion 46 described below. That is, the developer collecting screw 44 is a screw convey or member used for conveying the developer, collected by being slide down along the inclined surface 45*a* of the guiding member 45, in one direction while stirring the developer.

The developer circulating portion 46 is a supplying portion for supplying the developer to the first developing roller 30, and includes a regulating member 50, the developer supplying screw 42, and the developer stirring screw 43. In the developer circulating portion 46, the developer is supplied to the first developing roller 30 while the developer is conveyed in the substantially horizontal direction while being stirred in the developer supplying screw 42 and the developer stirring screw 43. Further, as described above, the developer collected by the developer collecting portion 47 is dropped by its own weight and is guided to the developer circulating portion 46. That is, the developer circulating portion 46 is positioned below the developer collecting portion 47 with respect to the vertical direction.

The developer supplying screw 42, the developer stirring screw 43, and the developer collecting screw 44 are screw conveyor members for conveying the developer in one direction while stirring the developer, and the developer supplying screw 42 and the developer stirring screw 43 are positioned below the developer collecting screw 44 with respect to the vertical direction. Further, the developer supplying screw 42, the developer stirring screw 43, and the developer collecting screw 44 are disposed so that their rotational axes are substantially parallel to each other. The rotational axes of these screws are also substantially parallel to the rotational axis of the first developing roller 30.

The developer supplying screw 42 is positioned between the first developing roller 30 and the developer stirring screw 43, and between itself and the developer stirring screw 43, a partition wall 48 of the developing container 60 is provided. The partition wall 48 of the developing container 60 is extended along rotational axis directions of the developer supplying screw 42 and the developer stirring screw 43. The partition wall 48 is provided with a communication opening (not shown) for establishing communication between a first feeding path 61 along which the developer is fed by the developer supplying screw 42 and a second feeding path 62 along which the developer is fed by the developer stirring screw 43.

The developer stirred by the developer collecting screw 44 passes through a communication opening (not shown) formed in a partition wall 63 of the developing container 60 positioned between the developer collecting screw 44 and the developer supplying screw 42 and then is dropped toward the developer supplying screw 42 by its own weight. The above-described guiding member 45 is formed integrally with the partition wall 63, and above the partition wall 63, the developer collecting screw 44 is disposed.

A position of the communication opening through which the developer stirred by the developer collecting screw 44 is dropped by its own weight and is guided into the developer circulating portion 46 may preferably be disposed while avoiding a region (an intermediary portion with respect to the developer supplying screw 42) in which the developer is supplied toward the first developing roller 30. In this embodiment, the position of the communication opening is a position where the communication opening position is included in a range of a downstream end portion (terminal portion) with respect to a developer feeding direction of the first feeding path 61 in which the developer supplying screw 42 is disposed.

Developer feeding directions of the developer supplying screw 42 and the developer stirring screw 43 are mutually opposite directions. Further, a starting end side (upstream end side in the developer feeding direction) and a terminal end side (downstream end side in the developer feeding direction) of the first feeding path 61 in which the developer supplying screw 42 is disposed, and a terminal end side and a starting end side of the second feeding path 62 in which the developer stirring screw 43 is disposed communicate with each other, respectively, via communication openings provided in the partition wall 48. Accordingly, the developer is circulated in the rotational directions of the developer supplying screw 42 and the developer stirring screw 43 indicated by arrows in FIG. 2 and in the substantially horizontal direction in the developing container 60, so that a part of the developer is supplied toward the first developing roller 30.

A developer supply opening 51 (see FIG. 2) is provided above the developer stirring screw 43 in the developing container 60 and is connected to the developer storage portion 27Y (see FIG. 1). Further, the developer supply opening 51 is constituted so as to be capable of supplying the developer, accommodated in a bottle mounted in the developer storage portion 27Y, to the second feeding path 62 in which the developer stirring screw 43 is disposed.

As described above, a toner weight ratio of the developer accommodated in the bottle of the developer storage portion 27Y is larger than a toner weight ratio of the developer in the developing device 1Y, and therefore, by adjusting an amount of the developer supplied to the developer stirring screw 43, the toner weight ratio of the developer in the developing device 1Y can be maintained at a certain level.

A toner concentration detecting sensor 49 (see FIG. 2) is provided for detecting a toner concentration of the developer contained in the developer circulating portion 46. The toner concentration detecting sensor 49 is a sensor for detecting (magnetic) permeability. The toner concentration corresponds to a consumption amount of the toner in the developing device 1Y, and therefore, is utilized in control of supply of the developer from the developer storage portion 27Y. For example, when the toner concentration is detected that the toner concentration is lowered than a predetermined value, the developer is supplied from the developer storage portion 27Y. The permeability changes depending on the toner concentration, and therefore, by utilizing the permeability, it is possible to detect the toner concentration.

The regulating member 50 is disposed adjacent to the first developing roller 30 and is used for regulating an amount of the developer supplied from the developer circulating portion 46 to the first developing roller 30. The regulating member 50 can be constituted so as to regulate an amount of the developer attracted to the first developing roller 30, on the basis of a gap between the surface of the first sleeve 33 of the first developing roller 30 and an end portion of the regulating member 50.

A circulating path of the developer in the developing container 60 is such that the developer is fed in the substantially horizontal direction while being stirred in the developer circulating portion 46 and thereafter is supplied to the first developing roller 30, and then is delivered from the first developing roller 30 to the second developing roller 31 positioned above the first developing roller 30, on the basis of the magnetic force. Then, the developer is delivered from the second developing roller 31 to the peeling roller 32 positioned beside the second developing roller 31, on the basis of the magnetic force again, and thereafter, is peeled off from the peeling roller 32 by the third magnet 38 included in the peeling roller 32, and thereafter, the developer is collected by the developer collecting portion 47 and then is guided again into the developer circulating portion 46.

Further, as described above, in this embodiment, a two-component development type is used as a development type, and as the developer, a developer obtained by mixing non-magnetic toner having a negative charging property with a carrier having a magnetic property is used. The non-magnetic toner is toner obtained by containing a colorant, a wax component, and the like in a resin such as polyethylene or styrene-acrylic resin, by forming the mixture in powder through pulverization or polymerization, and then by adding fine powder of titanium oxide, silica, or the like to a surface of the powder. The magnetic carrier is a carrier obtained by coating a resin material on a surface layer of a core comprising resin particles obtained by kneading ferrite particles or magnetic powder. The toner concentration in the developer (a weight ratio of the toner to the developer) in an initial state is 8% in this embodiment.

In general, the two-component development type using the toner and the carrier has a feature such that stress exerted on the toner is less than stress exerted on the toner in a one-component development type using a one-component developer because the toner and the carrier are charged to predetermined polarities by subjecting the toner and the carrier to triboelectric contact. A surface area of the carrier in the developer is larger than a surface area of the toner in the developer, so that a degree of carrier contamination with the toner deposited on the carrier surface is also small. However, by long-term use, an amount of a contaminant (spent) deposited on the carrier surface increases, and therefore, toner charging capacity gradually lowers. As a result, problems of a fog and a toner scattering arise. Although an amount of the carrier accommodated in the developing device is increased in order to prolong a lifetime of the two-component developing device, this causes upsizing of the developing device, and therefore is not desirable.

In order to solve the above-described problems on the two-component developer, in this embodiment, an ACR (auto carrier refresh) type is employed. The ACR type is a type such that an increase in amount of a deteriorated developer is suppressed by not only supplying a fresh developer little by little from the developer storage portion 27Y into the developing device 1Y but also discharging the developer, deteriorated in charging performance, little by little through a discharge opening (not shown) of the developing device 1Y. By this, the deteriorated carrier in the developing device 1Y is replaced with a fresh carrier, so that the charging performance of the carrier in the developing device 1Y can be maintained at an approximately constant level.

[Magnetic Poles of Magnets]

Next, magnetic pole constitutions of the first magnet 36, the second magnet 37, and the third magnet 38 included in the first developing roller 30, the second developing roller 31, and the peeling roller 32, respectively, which are shown in FIGS. 3, 4, and 5, respectively, will be described.

As shown in FIG. 3, the first magnet 36 included in the first developing roller 30 is provided with a magnetic pole 106 as a first magnetic pole, a magnetic pole 107 as a second magnetic pole, and further a plurality of magnetic poles 101, 102, 103, 104, and 105. The magnetic poles 101 to 107 are disposed in a named order in the rotational direction of the first sleeve 33.

The magnetic pole 106 is a magnetic pole for delivering the developer from the first sleeve 33 to the second sleeve 34 by a magnetic field generated in cooperation with the second developing roller 31 and the second magnet 37. The magnetic pole 107 is a magnetic pole which is positioned downstream of the magnetic pole 106 with respect to the rotational direction of the first sleeve 33 and which is for attracting the developer, dropped from above, to the surface of the first sleeve 33.

Further, in this embodiment, with respect to a rotational direction of the first sleeve 33, at a position adjacent to a downstream side of the magnetic pole 106, a repelling magnetic field region 110 as a low magnetic force portion (region low in magnetic force between itself and the magnetic pole 106 due to a magnetic force of adjacent same magnetic poles) lower in magnetic force than the magnetic pole 106 is provided. Further, the magnetic pole 107 is disposed at a position adjacent to the downstream side of the repelling magnetic field region 110 with respect to the rotation direction of the first sleeve 33. The repelling magnetic field region 110 includes a region of which magnetic flux density is 5 mT or less. This is true for the repelling magnetic field regions 210 and 310. Further, the spacer 111 as a low magnetic force is disposed adjacent to a downstream side of the magnetic pole 107 and an upstream side of the magnetic pole 101 with respect to the rotational direction of the first sleeve 33. The spacer 111 does not have the magnetic force, but may also be a magnetic pole low in magnetic force and, for example, a magnetic pole of which magnetic flux density is 5 mT or less.

Further, the magnetic pole 101 is an S pole and is used for attracting the developer, supplied from the developer supplying screw 42, to the first sleeve 33. The magnetic poles 102, 103, 104, and 105 are an N pole, an S pole, an N pole, and an S pole and used for feeding upward the developer attracted by the magnetic pole 101 with rotation of the first sleeve 33. The magnetic pole 106 is an N pole and delivers the developer from the first sleeve 33 to the second sleeve 34 opposing the first sleeve 33 by a magnetic field generated in cooperation with a magnetic pole 201 in the second magnet 37 included in the second developing roller 31 as described above.

As shown in FIG. 4, the second magnet 37 included in the second developing roller 31 is provided with a magnetic pole 201 as a sixth magnetic pole and a magnetic pole 207 as a seventh magnetic pole with a plurality of magnetic poles 202, 203, 204, 205, and 206. The magnetic poles 201 to 207 are disposed in a named order in the rotational direction of the second sleeve 34.

The magnetic pole 201 is a magnetic pole for attracting the developer from the first sleeve 33 to the second sleeve 34 by a magnetic field generated in cooperation with the magnetic pole 106 of the first magnet 36 of the first developing roller 30. The magnetic pole 207 is a magnetic pole which is disposed downstream of the magnetic pole 201 with respect to the rotational direction of the second sleeve 34 and above a point P (see FIG. 6) described later and which is for delivering the developer from the second sleeve 34 to the third sleeve 35 by a magnetic field generated in cooperation with the third magnet 38 of the peeling roller 32.

Further, the magnetic pole 201 is an S pole and is used for attracting the developer from the first developing roller 30

(first sleeve 33) to the second sleeve 34 as described above. The magnetic poles 202, 203, 204, 205 and 206 are an N pole, an S pole, an N pole, an S pole, and an N pole and are used for feeding upward the developer attracted by the magnetic pole 201 with rotation of the second sleeve 34. The magnetic pole 207 is an S pole and delivers the developer, after passing through a developing region with the photosensitive drum 28Y corresponding to the magnetic pole 203, from the second sleeve 34 to the third sleeve 35 opposing the second sleeve 34 by a magnetic field generated in cooperation with a magnetic pole 303 in the third magnet 38 included in the peeling roller 32.

As shown in FIG. 5, the third magnet 38 included in the peeling roller 32 is provided with a plurality of magnetic poles 301, 302, 303, 304, and 305. The magnetic poles 301 to 305 are disposed in a named order in the rotational direction of the third sleeve 35.

The magnetic pole 303 is an N pole and is used for attracting the developer, peeled off from the second sleeve 34 as described above, to the third sleeve 35. The magnetic poles 301, 302, and 304 are an N pole, and an S pole, and an S pole are used for feeding the developer on the third sleeve 35 with rotation of the third sleeve 35. Particularly, the magnetic pole 304 is used for feeding downward the developer attracted by the magnetic pole 303 with rotation of the third sleeve 35. The magnetic pole 305 is an N pole and is peeling pole used for peeling off the developer, attracted to the third sleeve 35, from the third sleeve 35 by a repelling magnetic field generated in cooperation with the magnetic pole 301 having the same pole.

[Magnetic Pole Arrangement Relationship]]

Figure 6:
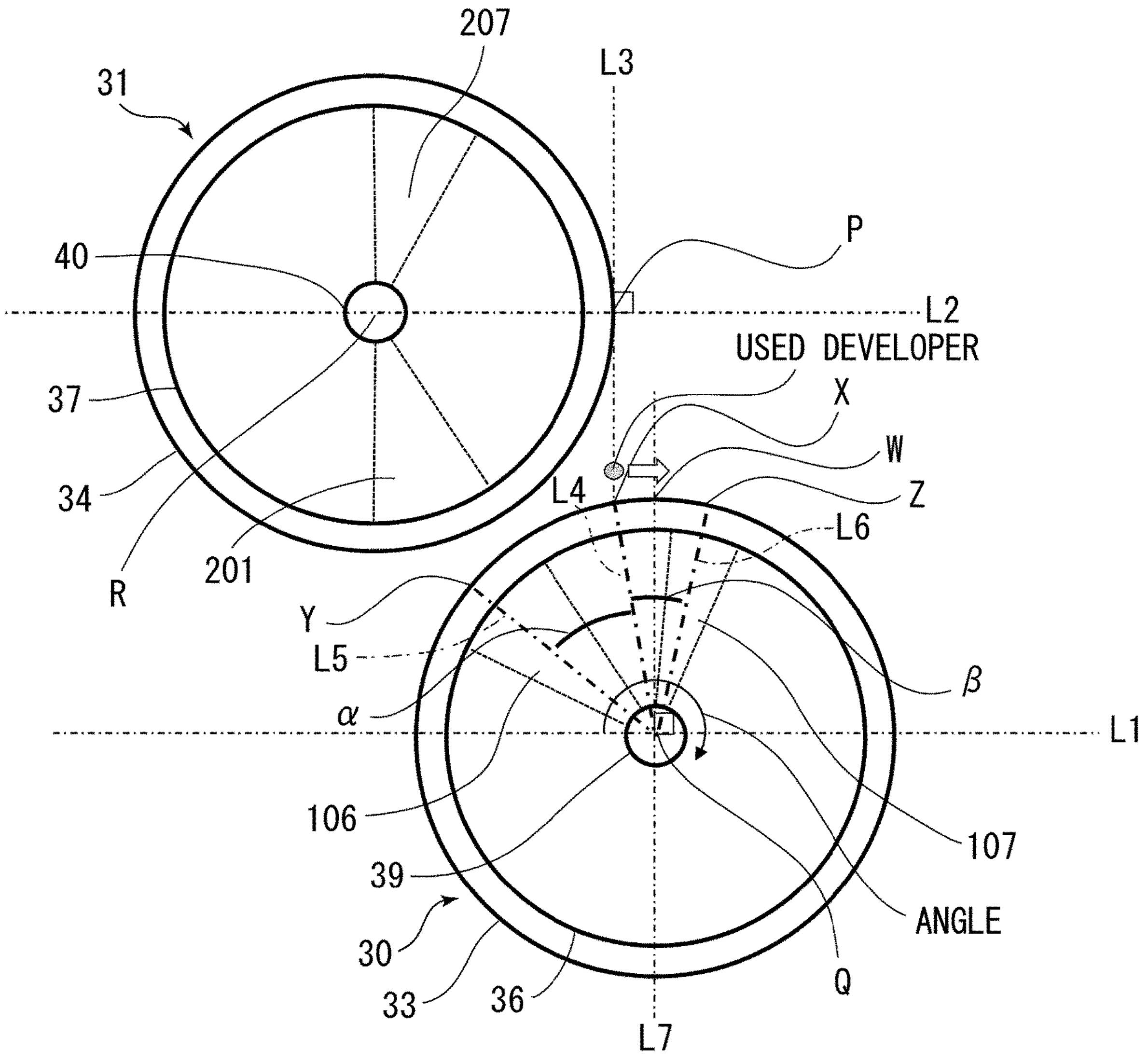
FIG. 6 is a schematic view showing a relationship of a magnetic pole arrangement between the first developing roller and the second developing roller in the first embodiment.

Next, a magnetic pole arrangement relationship of the first magnet 36 and the second magnet 37 disposed inside the first developing roller 30 and the second developing roller 31, respectively, will be described using FIGS. 6 to 8. FIG. 6 is a conceptual view for illustrating an arrangement of the first developing roller 30 and the second developing roller 31 in this embodiment, and particularly shows a layout of the magnetic pole (first magnetic pole) 106 and the magnetic pole (second magnetic pole) 107 of the first magnet 36 of the first developing roller 30 and the magnetic pole (sixth magnetic pole) 201 of the second magnet 37 of the second developing roller 31.

In this embodiment, the developer in the developing device 1Y moves from the surface of the first sleeve 33 of the first developing roller 30 to the surface of the second sleeve 34 of the second developing roller 31, and moves to the surface of the third sleeve 35 of the peeling roller 32 after being used in a developing step of the electrostatic latent image on the photosensitive drum 28Y. Here, when the developer moves from the surface of the second sleeve of the second developing roller 31 to the surface of the third sleeve 35 of the peeling roller 32, all the developer on the second sleeve 34 is not necessarily moved onto the third sleeve 35, but a part of the developer on the second sleeve 34 remains on the second sleeve 34. In the following, the developer remaining on the second sleeve 34 after the developing step is referred to as a used developer.

The used developer remaining on the second sleeve 34 is conveyed from the neighborhood of a magnetic pole (seventh magnetic pole) 207 of the second magnet 37 of the second developing roller 31 in a direction downstream of the rotational direction of the second sleeve 34. Then, on a side downstream of a horizontal line L2 passing through a rotation center R of the second sleeve 34 with respect to the rotational direction, the used developer is separated from the second sleeve 34 and is dropped by gravity.

Here, points P, X, Y, and Z are defined as follows.

Point P: a point where the horizontal line L2 passing through the rotation center R of the second sleeve 34 and the surface of the second sleeve 34 intersect with each other and which is positioned on a side opposite from the photosensitive drum 28Y with respect to the rotation center R Point X: a point where a vertical line L3 passing through the point P and the surface of the first sleeve 33 intersect with each other and which is positioned above a rotation center Q of the first sleeve Point Y: a peak position of a magnetic flux density of the magnetic pole 106 on the surface of the first sleeve 33 in a normal direction, which is positioned on a side upstream of the point X with respect to the rotational direction of the first sleeve Point Z: a peak position of a magnetic flux density of the magnetic pole 107 on the surface of the first sleeve 33 in the normal direction which is positioned on a side downstream of the distance X with respect to the rotational direction of the first sleeve The used developer dropped from the point P of the second sleeve 34 moves in a direction of the first sleeve 33 positioned below the second sleeve 34 in the vertical direction. When the used developer approaches the neighborhood of the first sleeve 33, by a magnetic field of the magnetic poles 106 and 107 of the first magnet 36 included in the first developing roller 30, the used developer is attracted to either one of the magnets. For this reason, the used developer is adsorbed in the neighborhood of the magnetic pole 106 or the magnetic pole 107 on the first sleeve 33.

Whether the used developer is attracted to which one of the magnetic pole 106 and the magnetic pole 107 is determined depending on that the used developer is close to which one of the magnetic poles 106 and 107 in terms of a distance of a position, where the used developer is vertically dropped from the point P on the second sleeve 34 to the first sleeve 33, from the magnetic poles 106 and 107. That is, whether the used developer is attracted to which one of the magnetic poles 106 and 107 is determined by which one of the magnetic poles 106 and 107 has the influence on the used developer dropped on the first sleeve 33.

As shown in FIG. 6, the vertical line L3 is drawn from the point P on the second sleeve 3,4 and the point X which is an intersect point between the vertical line L3 and the first sleeve 33 corresponds to a position where the used developer is vertically dropped from the point P onto the first sleeve 33 as it is. Further, as described above, the peak position of the magnetic flux density of the magnetic pole 106 is the point Y, and the peak position of the magnetic flux density of the magnetic pole 107 is the point Z. Further, a rectilinear line connecting the rotation center Q and the point X of the first sleeve 33 is a rectilinear line L4, a rectilinear line connecting the rotation center Q and the point Y is a rectilinear line L5, and a rectilinear line connecting the rotation center Q and the point Z is a rectilinear line L6. The rectilinear lines L4, L5, and L6 are indicated by broken lines in FIG. 6.

Further, an angle (acute angle) formed between the rectilinear line L4 and the rectilinear line L5 is $\alpha$, and an angle (acute angle) formed between the rectilinear line L4 and the rectilinear line L6 is $\beta$. In the neighborhood of the first sleeve 33, the above-described used developer moves in a direction of a smaller angle of the above-described angles $\alpha$ and $\beta$, i.e., in a direction in which the magnetic pole 106 or the magnetic pole 107 has the influence on the used developer. If the used developer moves toward the magnetic pole

106 side, i.e., toward a side upstream of the point X with respect to the rotational direction of the first sleeve 33, there is a liability that the used developer enters a developer delivering portion positioned in the neighborhood of a closest position between the first developing roller 30 and the second developing roller 31. When the used developer enters the developer delivering portion, as described above, there is a liability that the image defect such as the density unevenness or the stripe-shaped image is generated on the output image.

Therefore, in this embodiment, the first magnet 36 and the second magnet 37 are constituted so as to satisfy $\alpha>\beta$. By satisfying $\alpha>\beta$, as shown in FIG. 6, the used developer dropped from the point P on the second sleeve 34 is liable to be adsorbed in the neighborhood of the first sleeve 33 in a direction of the magnetic pole 107 in the first magnet 36 as indicated by an arrow. Then, the used developer adsorbed in the neighborhood of the first sleeve 33 is conveyed toward the downstream side of the rotational direction of the first sleeve 33 by the first sleeve 33.

As a result of this, it becomes possible to suppress that the used developer is conveyed to the neighborhood of the closest position between the first developing roller 30 and the second developing roller 31.

Further, a point where a vertical line L7 passing through the rotation center Q of the first sleeve 33 and the surface of the first sleeve 33 intersect with each other and which is positioned above the rotation center Q is a point W. In this case, with respect to the rotational direction of the first sleeve 33, the point Z may preferably be positioned on a side downstream of the point W. On the other hand, the point Y may preferably be positioned on a side upstream of the point W. The points Y and Z are positioned above a horizontal line L1 passing through the rotation center Q of the first sleeve 33 in the vertical direction.

As described above, in this embodiment, with respect to the rotational direction of the first sleeve 33, the point Z is positioned on the side downstream of the point X. This is because the magnetic pole 107 of the first developing roller 30 and the magnetic pole 201 of the second developing roller 31 are in a different magnetic pole relationship, and therefore, in the case where the point Z is positioned on the same position as the point X with respect to the rotational direction of the first sleeve 33 and in the case where the point Z is positioned on a side upstream of the point X with respect to the rotational direction of the first sleeve 33, a delivering magnetic field is generated between the magnetic pole 107 of the first developing roller 30 and the magnetic pole 201 of the second developing roller 31. As a result, with respect to the rotational direction of the first sleeve 33, in the case where the point Z is positioned in the same position as the point X and in the case where the point Z is positioned on the side upstream of the point X, in the neighborhood of the first sleeve 33, the used developer dropped from the point P on the second sleeve 34 is not readily adsorbed in the direction of the magnetic pole 107 of the first developing roller 30. Therefore, in this embodiment, with respect to the rotational direction of the first sleeve 33, the point Z is positioned on the side downstream of the point X, so that the used developer dropped from the point P on the second sleeve 34 is made liable to be adsorbed in the direction of the magnetic pole 107 of the first developing roller 30 in the neighborhood of the first sleeve 33.

Figure 7:
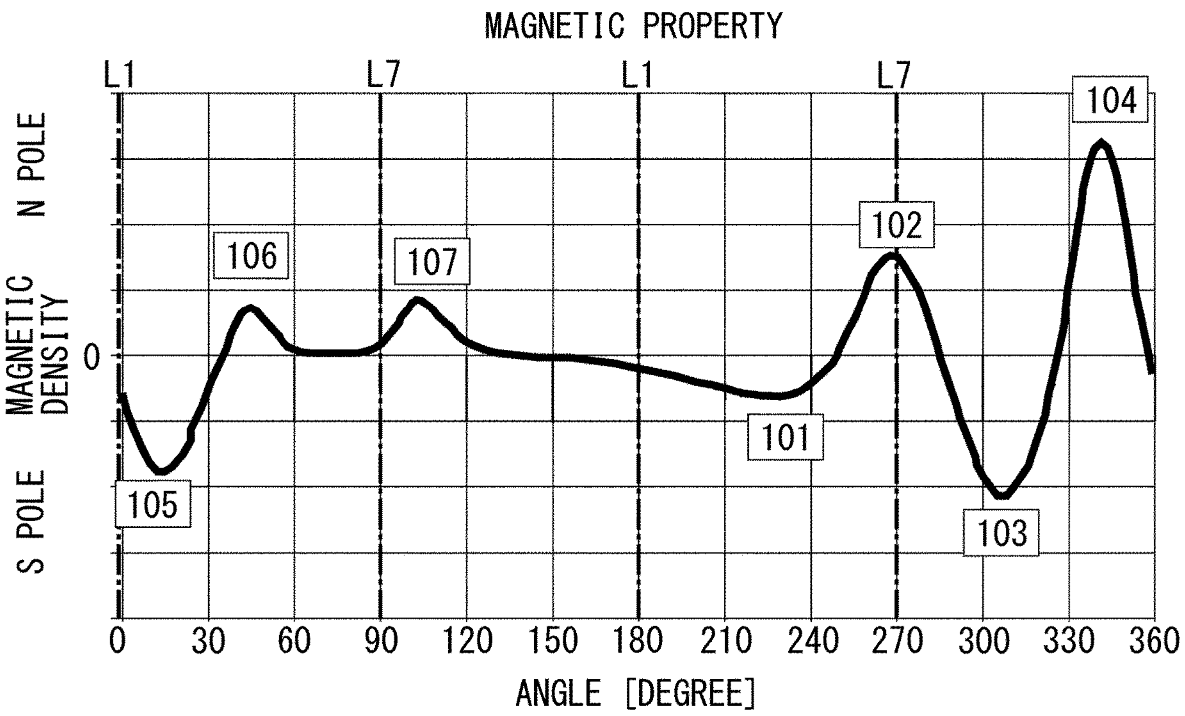
FIG. 7 is a graph showing a magnetic property of the first developing roller in the first embodiment.
Figure 8:
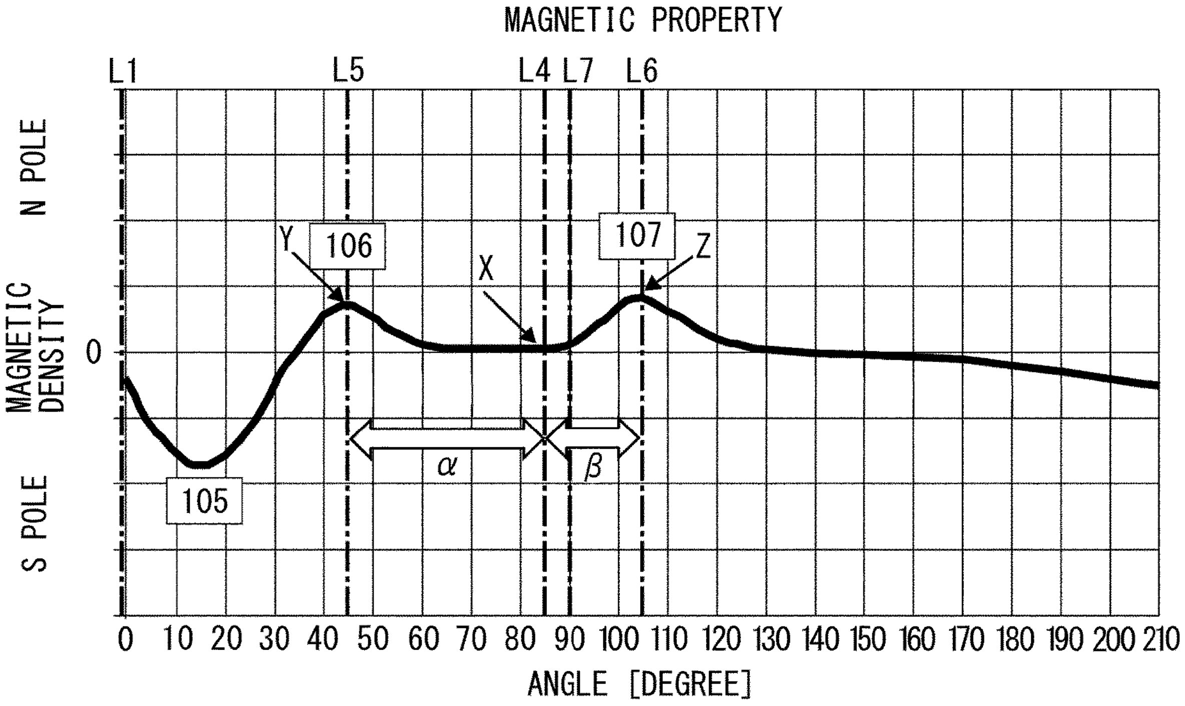
FIG. 8 is graph showing a part of FIG. 7 in an enlarged manner.

A magnetic property distribution of the first magnet 36 in this embodiment is shown in each of FIGS. 7 and 8. FIG. 7 shows positions with respect to an angle direction and magnitudes of magnetic flux densities, of the magnetic poles 101 to 107 included in the first magnet 36 shown in FIGS. 3 and 6. In FIG. 7, an abscissa represents, as an angle setting, an angle (indicated by an arrow in FIG. 6) of the first magnet 36 with respect to the rotational direction of the first sleeve 33 when a position of the first magnet 36 on the photosensitive drum 28Y side relative to the horizontal line L1 on the rotation center Q of the first developing roller 30 is taken as 0 degrees. In FIG. 7, an ordinate represents a measurement result of the magnetic flux density of the first magnet 36 with respect to the normal direction at an associated angle of the first magnet 36 with respect to the rotational direction.

FIG. 8 shows a portion in the neighborhood of the magnetic pole 106 and the magnetic pole 107 in FIG. 7 in an enlarged manner, in which the rectilinear lines L1 and L4 to L7 on the first sleeve 33 are indicated by chain lines, and magnitudes of the angles $\alpha$ and $\beta$ are indicated by double-pointed arrows in FIG. 8. In the first magnet 36 in this embodiment, the magnetic pole 107 is set to provide the angle $\alpha$=40 degrees and the angle $\beta$=20 degrees. Here, set values employed in this embodiment are examples, and the above-described angles $\alpha$ and $\beta$ may only be required to satisfy a relationship of $\alpha>\beta$ and may preferably satisfy a relationship of $35°\leq\alpha\leq45°$. By satisfying these relationships, the used developer is attracted toward the magnetic pole 107 and is moved toward the downstream direction of the rotational direction of the first sleeve 33.

Comparison Example

Next, a comparison example compared with this embodiment will be described using FIGS. 9, 10, and 11.

In the comparison example, a constitution of a first magnetic pole 36A such that a relationship between angles $\alpha$ and $\beta$ is $\alpha<\beta$, and an arrangement and a magnetic property distribution of a first developing roller 30 and a second developing roller 31 at that time are presented.

Figure 9:
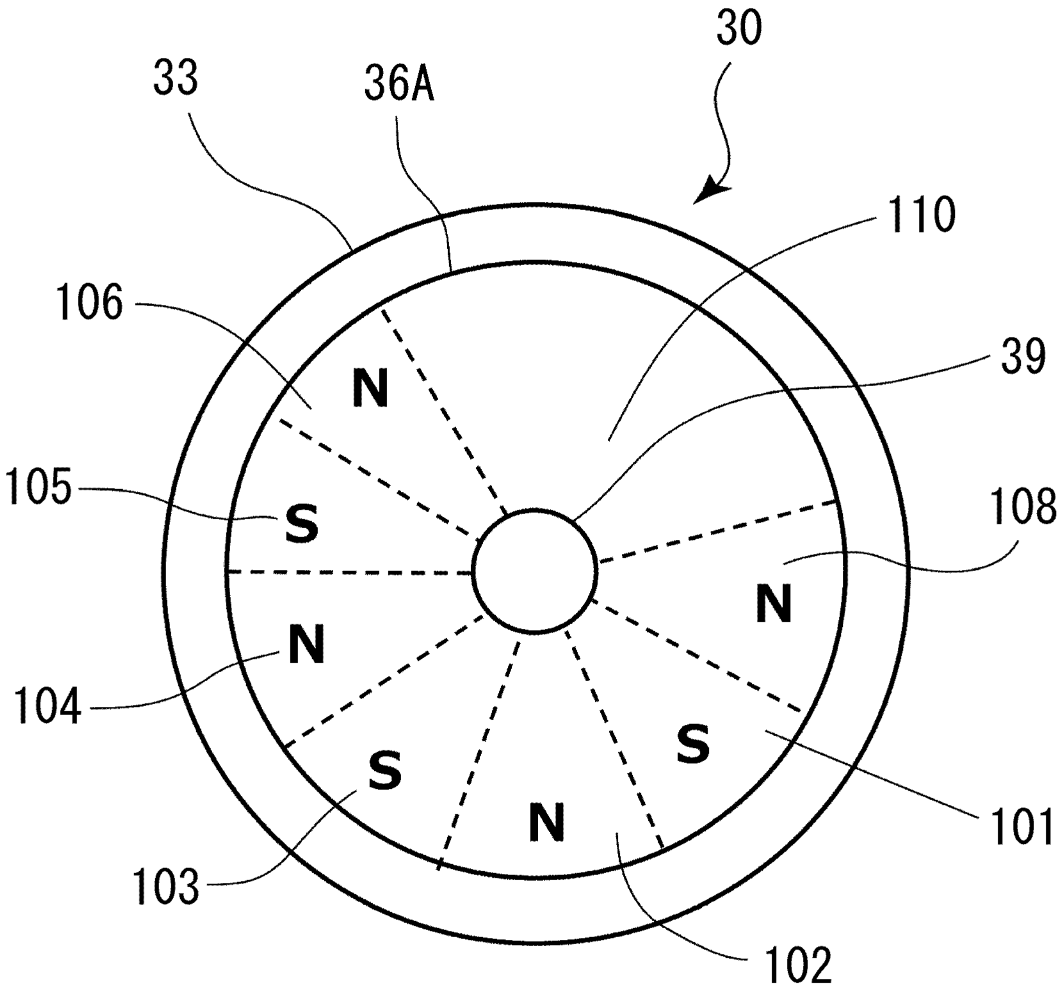
FIG. 9 is a schematic view showing a magnetic pole arrangement of a first developing roller in a comparison example.

FIG. 9 shows a magnetic pole constitution of the first magnetic pole 36A in the comparison example, in which the magnetic pole 107 of the first magnet 36 shown in FIG. 3 in this embodiment is removed and in which a magnetic pole 108 is newly provided on a side downstream of the position of the magnetic pole 107 with respect to the rotational direction of the first sleeve 33. Other magnetic poles 101 to 106 are the same as those shown in FIG. 3.

Figure 10:
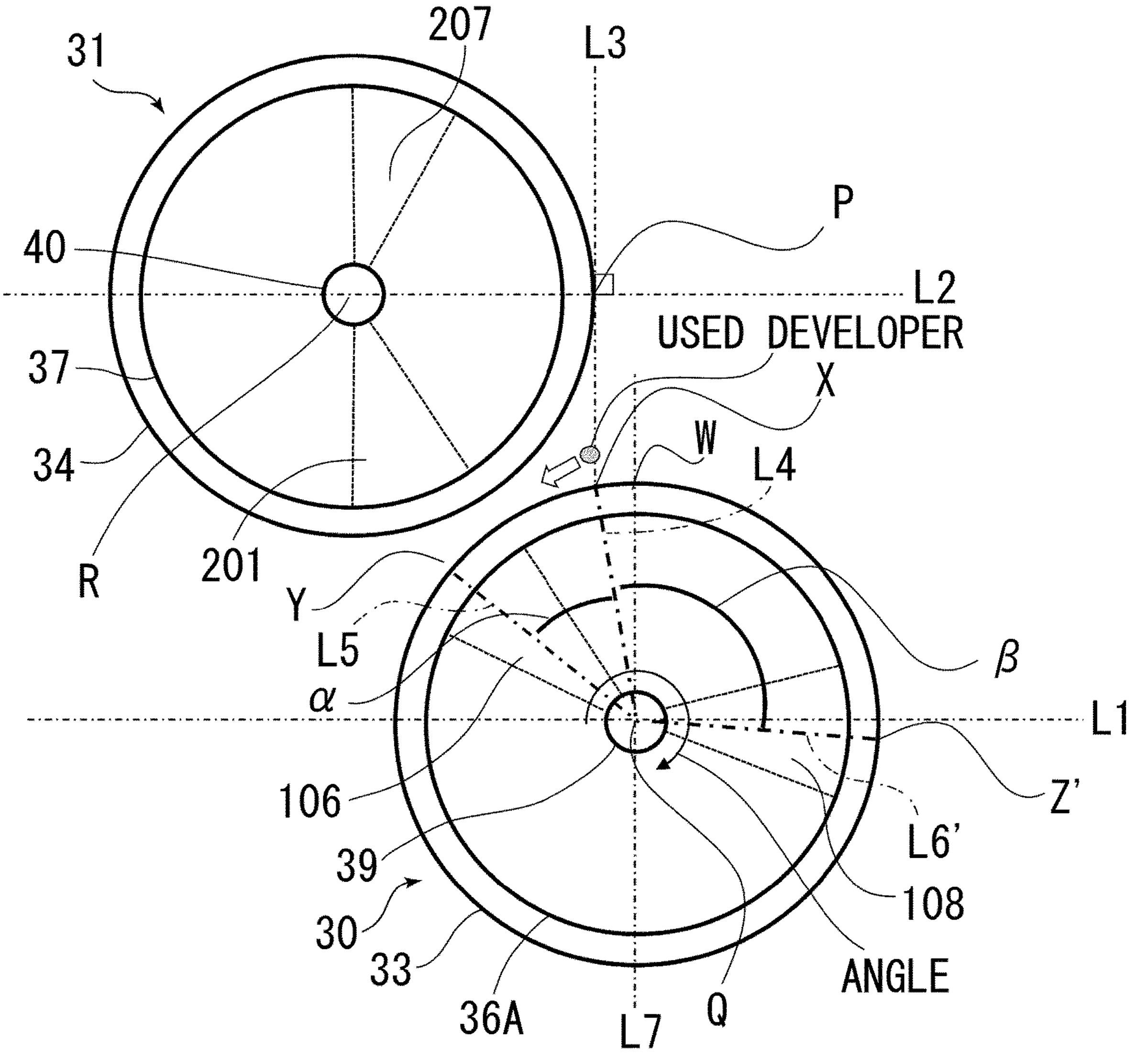
FIG. 10 is a schematic view showing a relationship of a magnetic pole arrangement of the first developing roller and a second developing roller in the comparison example.
Figure 11:
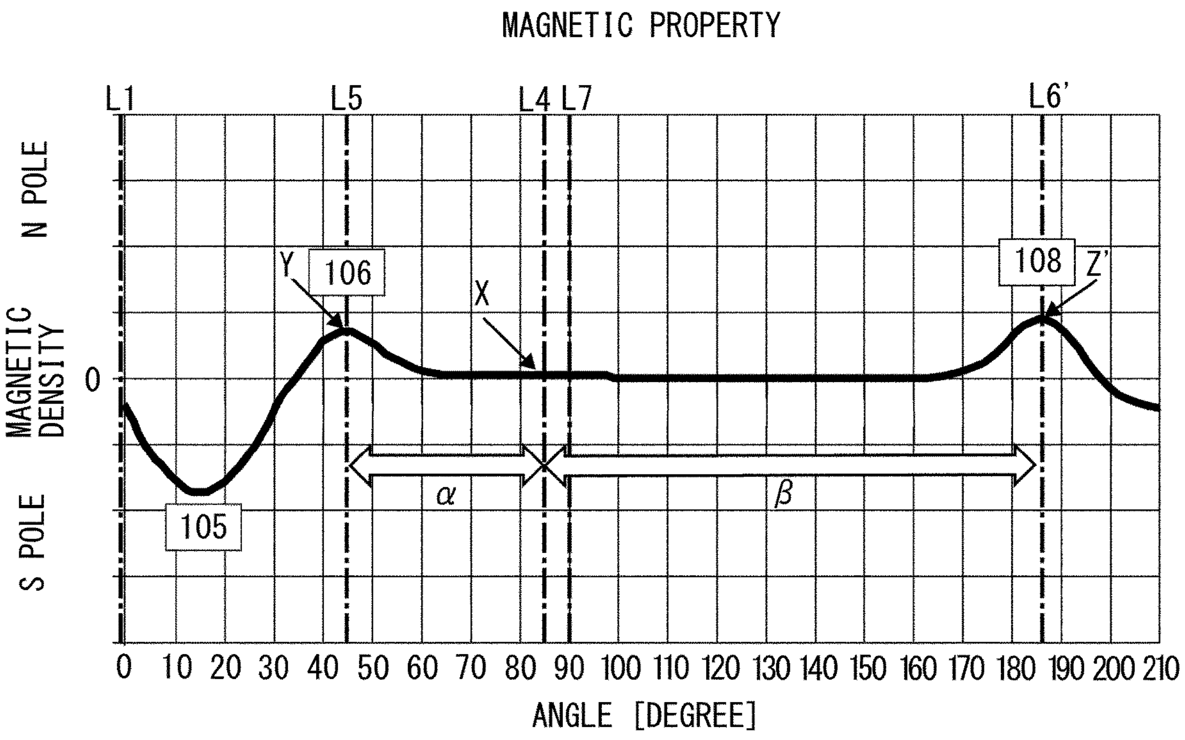
FIG. 11 is a graph showing a magnetic property of the first developing roller in the comparison example.

FIG. 10 is a conceptual view illustrating an arrangement of the first developing roller 30 and the second developing roller 31 in the comparison example, in which the arrangement of the first developing roller 30 and the second developing roller 31 is the same as the arrangement in this embodiment. A peak position of the magnetic flux density of the magnetic pole 108 in the vertical direction is a point Z', and a rectilinear line connecting the rotation center Q of the first sleeve 33 and the point Z' is a rectilinear line L6'. Further, the angle $\beta$ in the comparison example is an angle (acute angle) formed between the rectilinear line L4 and the rectilinear line L6'. FIG. 11 is a graph similar to the graph of the above-described FIG. 8, in which the rectilinear lines L1, L4, L5, L6', and L7 on the first sleeve 33 are indicated by chain lines.

In FIG. 10, the used developer dropped from the point P on the second sleeve 34 is moved in a direction toward the first sleeve 33 positioned below the second sleeve 34 in the vertical direction. When the used developer approaches the neighborhood of the first sleeve 33, the used developer is pulled toward the magnetic pole 106 of the first magnet 36 as shown by an arrow in FIG. 10.

As described above, in the neighborhood of the closest position between the first developing roller 30 and the second developing roller 31, a delivering magnetic field is generated between the magnetic pole 106 of the first developing roller 30 and the magnetic pole 201 of the second developing roller 31, and therefore, the used developer moves toward the second developing roller 31 by the delivering magnetic field. That is, the used developer dropped from the surface of the second sleeve 34 is scooped on the second sleeve 34 again, and thus drag occurs, so that an uneven (irregular) image is generated on an output image.

On the other hand, in this embodiment, the magnetic poles of the second magnet 37 are arranged as shown in FIG. 6, and therefore, it becomes possible to suppress that unevenness and stripes occur in the output image as in the comparison example. Here, in order to suppress the occurrence of such an image defect in the output image, as regards a positional relationship between the points X, Y, and Z on the first sleeve 33, it is required that the point 3 is positioned on a side downstream of the point X with respect to the rotational direction of the first sleeve 33. That is, the point Z is required to be positioned in a direction opposite to the point Y with respect to the point X.

Further, as described above, the position of the point Z may preferably be positioned on a side downstream, with respect to the rotational direction of the first sleeve 33, of a point W where the rectilinear line L7 passing through the rotation center Q of the first sleeve 33 and the surface of the first sleeve 33 intersect with each other. By this, the influences of the rotation of the first sleeve 33 and the gravity on the used developer are also taken into consideration, the vertical direction deposited on the first sleeve 33 becomes easy to be conveyed toward the downstream side of the rotational direction of the first sleeve 33. The position of the point Y may preferably be on a side upstream of the point W with respect to the rotational direction of the first sleeve 33 since the second developing roller 31 is positioned obliquely above the first developing roller 30 and the developer is delivered by a magnetic field generated by a cooperation between the magnetic pole 106 of the first developing roller 30 and the magnetic pole 201 of the second developing roller 31.

As described above, according to this embodiment, an occurrence of the image defect can be suppressed. That is, in the developing device 1Y of this embodiment, the developer is delivered from the first developing roller 30 to the second developing roller 31 above the first developing roller 30 on the basis of the magnetic force and then is delivered from the second developing roller 31 to the peeling roller 32 again on the basis of the magnetic force. In such a constitution, in some cases, the used developer is dropped from the second sleeve 34, from a delivering position thereof between the second developing roller 31 and the peeling roller 32 in the downstream of the rotational direction of the second sleeve 34. Also, in this instance, in this embodiment, $\alpha>\beta$ is satisfied as described above, and therefore, it is possible to suppress that the dropped used developer is conveyed to the delivering portion between the first developing roller 30 and the second developing roller 31 in the neighborhood of the closest position between the first developing roller 30 and the second developing roller 31.

Accordingly, even in a region where the image is formed at a high speed, it is possible to provide the developing device 1Y and the image forming apparatus 100 in which the developer is capable of being stably collected from the second sleeve 34 and is circulated in the developer circulating portion 46, and thus the developer is capable of being supplied to the first sleeve 33.

Second Embodiment

A second embodiment will be described using FIGS. 12 and 13. This embodiment is different from the first embodiment in constitution of magnetic poles of a first magnet 36B of a first developing roller 30. Other constitutions and actions are similar to those in the first embodiment, and therefore, as regards similar constitutions, description and illustration are omitted or briefly made by adding the same reference numerals or symbols, and in the following, a difference from the first embodiment will be principally described.

In the case of the above-described first embodiment, as shown in FIG. 3, the magnetic pole 107 of the first magnet 36 included in the first developing roller 30 and the magnetic pole 101 positioned on a side downstream of the magnetic pole 107 with respect to the rotational direction of the first sleeve 33 are in a relationship of different magnetic poles. For this reason, the used developer conveyed from the magnetic pole 107 by the first sleeve 33 is liable to be attracted in a direction toward the magnetic pole 101.

Figure 12:
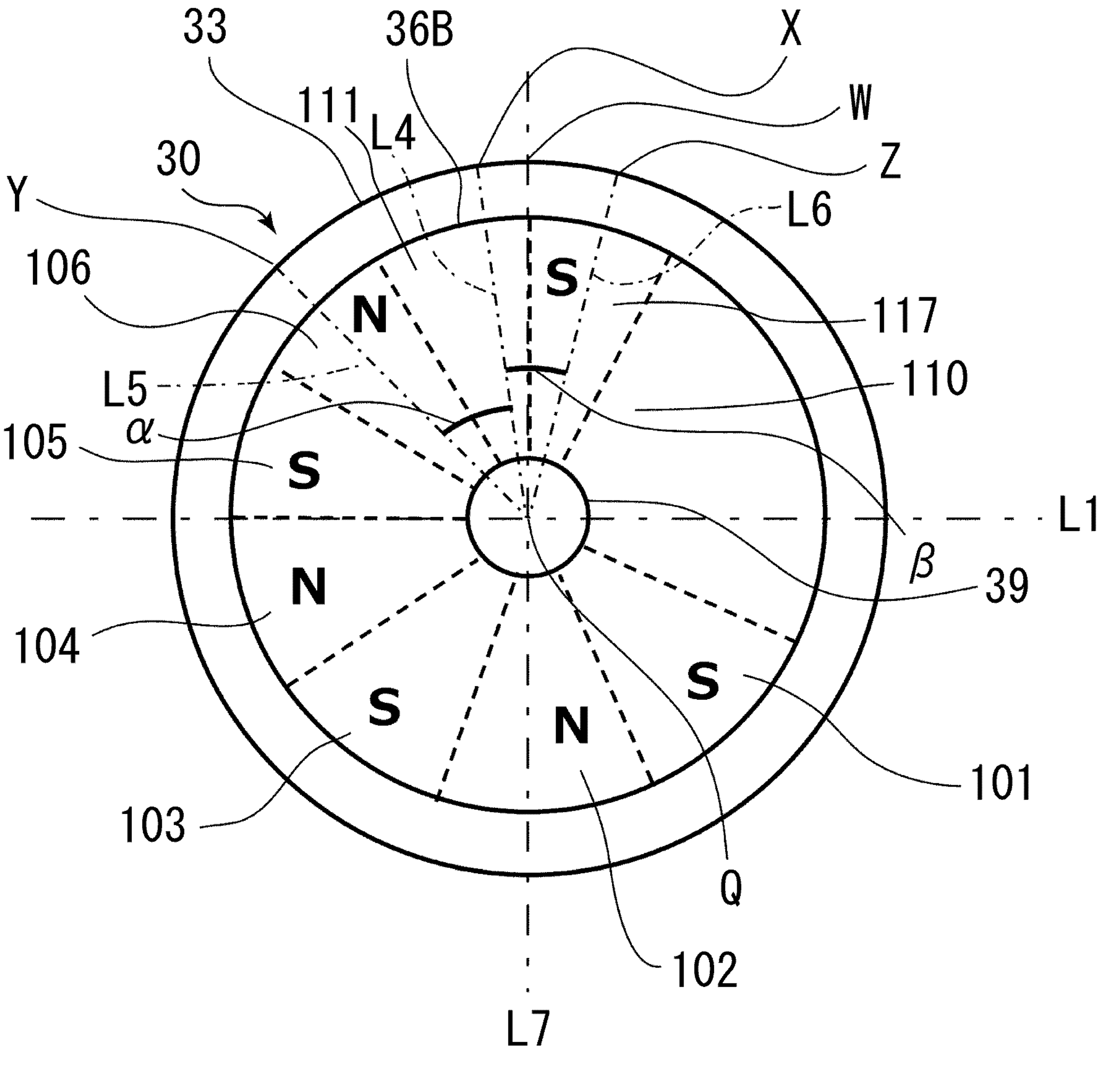
FIG. 12 is a schematic view showing a magnetic pole arrangement of a first developing roller in a second embodiment.
Figure 13:
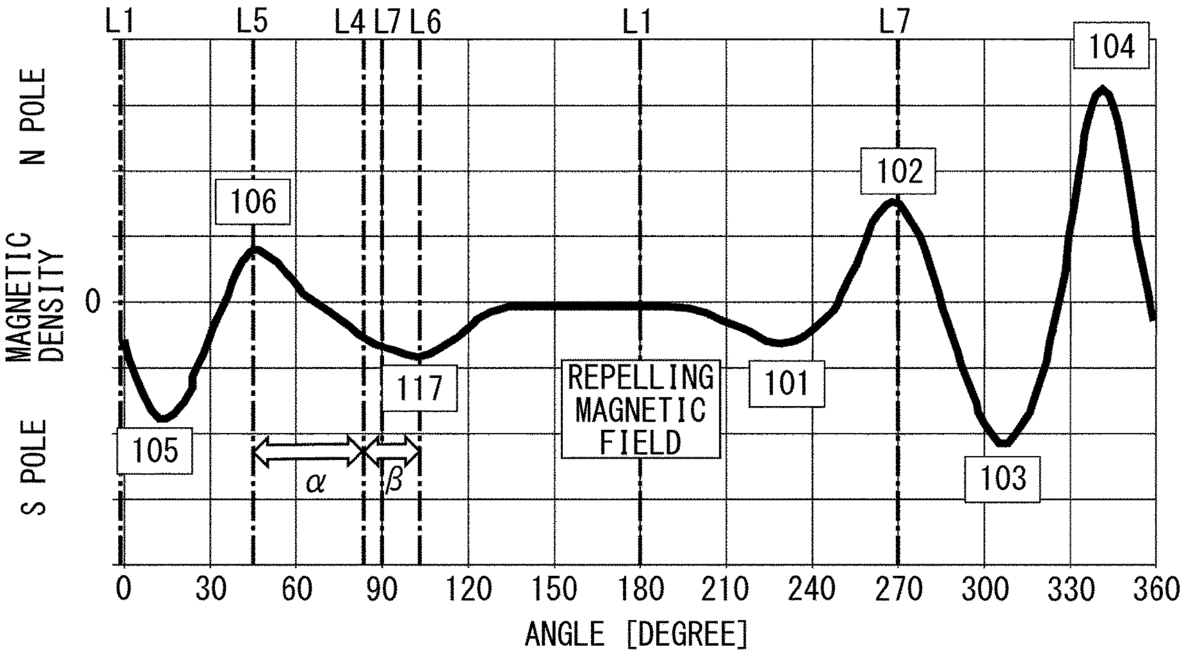
FIG. 13 is a graph showing a magnetic property of the first developing roller in the second embodiment.

On the other hand, in the first magnet 36B in this embodiment, as shown in FIG. 12, at the position of the magnetic pole 107 which is a receiving pole employed in the first embodiment, a magnetic pole 117 having the same polarity as the magnetic pole 101 is provided. The magnetic pole 117 is different in polarity from the magnetic pole 106. Here, the magnetic pole (third magnetic pole) 101 is provided on a side downstream of the magnetic pole (second magnetic pole) 117 with respect to the rotational direction of the first sleeve 33 and below the horizontal line L1 passing through the rotation center Q of the first sleeve 33 in the vertical direction. The magnetic pole 101 is adjacent to the magnetic pole 117 via a repelling magnetic field region 110. A magnetic property distribution of such a first magnet 36B is shown in FIG. 13.

As described above, the magnetic pole 117 has the same polarity as the magnetic pole 101 adjacent thereto on a downstream side of the rotational direction of the first sleeve 33, so that a repelling magnetic field is generated between the magnetic pole 117 and the magnetic pole 101. The used developer dropped from the second sleeve 34 is adsorbed in the neighborhood of the magnetic pole 117 of the first sleeve 33, and then, when conveyed to the downstream side of the rotational direction of the first sleeve 33, the used developer is peeled off from the first sleeve 33 by the repelling magnetic field generated between the magnetic pole 117 and the magnetic pole 101. In the repelling magnetic field, a region (including a region of which magnetic flux density is 5 mT or less) low in magnetic force is generated between adjacent magnetic poles having the same polarity by the influence of the adjacent magnetic poles.

Further, this repelling magnetic field may preferably be present on the horizontal line L1 on the rotation center Q of the first developing roller 30 or on a side downstream of the horizontal line L1 with respect to the rotational direction of the first sleeve 33. By this, peeling-off of the developer from the first sleeve 33 becomes easy in a region of a component lower than the horizontal line L1 of the rotation center Q of the first developing roller 30 in the direction of gravity. In this embodiment, a constitution in which the repelling magnetic field is present on the horizontal line L1 on the rotation center Q of the first developing roller 30 and on the downstream side of the rotational direction of the first sleeve 33 is employed.

The used developer peeled off from the first sleeve 33 is taken in the developer circulating portion 46 in the developing container 60, and then is stirred and mixed with another developer by the developer supplying screw 42 and the developer stirring screw 43.

Further, in the case of this embodiment, the point Z becomes a peak position of the magnetic flux density of the magnetic pole 117 in the normal direction relative to the surface of the first sleeve 33. Further, also, in the case of this embodiment, the rectilinear line connecting the rotation center Q and the point X is the rectilinear line L4, the rectilinear line connecting the rotation center Q and the point Y is the rectilinear line L5, the rectilinear line connecting the rotation center Q and the point Z is the rectilinear line L6, the angle (acute angle) formed between the rectilinear lines L4 and L5 is α, and the angle (acute angle) formed between the rectilinear lines L4 and L6 is β. In this case, as regards the positional relationship between the magnetic poles 106 and 117, these magnetic poles are disposed at positions satisfying α>β similarly as in the first embodiment. Further, in this embodiment, similarly as in the first embodiment, it is preferable that the relationship of 35°≤α≤45° is further satisfied.

Further, in this embodiment, similarly as in the first embodiment, with respect to the rotational direction of the first sleeve 33, the point Z is on the side downstream of the point X. This is because the magnetic pole 107 in the first magnet 6 and the magnetic pole 117 in the first magnet 36 are in a different magnetic pole relationship, and therefore, in the case where the point Z is positioned on the same position as the point X with respect to the rotational direction of the first sleeve 33 and in the case where the point Z is positioned on a side upstream of the point X with respect to the rotational direction of the first sleeve 33, a delivering magnetic field is generated between the magnetic pole 106 in the first magnet 36 and the magnetic pole 117 in the first magnet 36. As a result, with respect to the rotational direction of the first sleeve 33, in the case where the point Z is positioned in the same position as the point X and in the case where the point Z is positioned on the side upstream of the point X, in the neighborhood of the first sleeve 33, there is a liability that in the neighborhood of the closest position between the first developing roller 30 and the second developing roller 31, delivering efficiency of the developer by the magnetic field generated by the cooperation between the magnetic pole 106 of the first developing roller 30 and the magnetic pole 201 of the second developing roller 31 lowers. Therefore, in this embodiment, with respect to the rotational direction of the first sleeve 33, the point Z is positioned on the side downstream of the point X, so that in the neighborhood of the closest position between the first developing roller 30 and the second developing roller 31, the developer is made easy to be delivered by the magnetic field generated by the cooperation between the magnetic pole 106 of the first developing roller 30 and the magnetic pole 201 of the second developing roller 31.

Also, in such a case of this embodiment, it becomes possible to suppress not only that from the first developing roller 30 to the second developing roller 31 positioned above the first developing roller, the used developer peeled off from the second developing roller 31 is conveyed to the delivering portion between the first developing roller 30 and the second developing roller 31 in the neighborhood of the closest position between the first developing roller 30 and the second developing roller 31 but also the drag of the used developer by the second developing roller 31.

Third Embodiment

A third embodiment will be described using FIGS. 14 and 15. This embodiment is different from the first embodiment in constitution of magnetic poles of a first magnet 36C of a first developing roller 30. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 14:
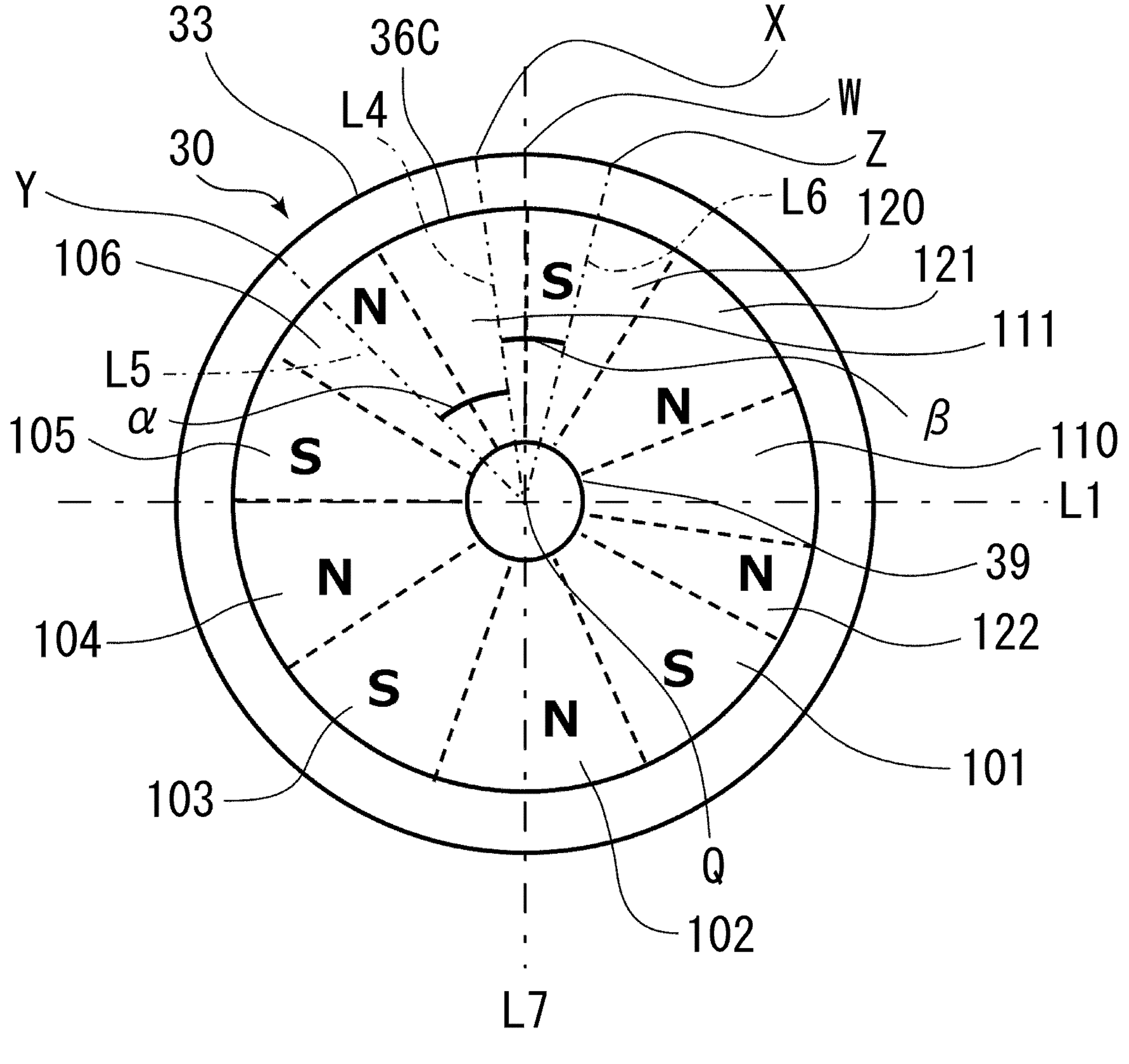
FIG. 14 is a schematic view showing a magnetic pole arrangement of a first developing roller in a third embodiment.
Figure 15:
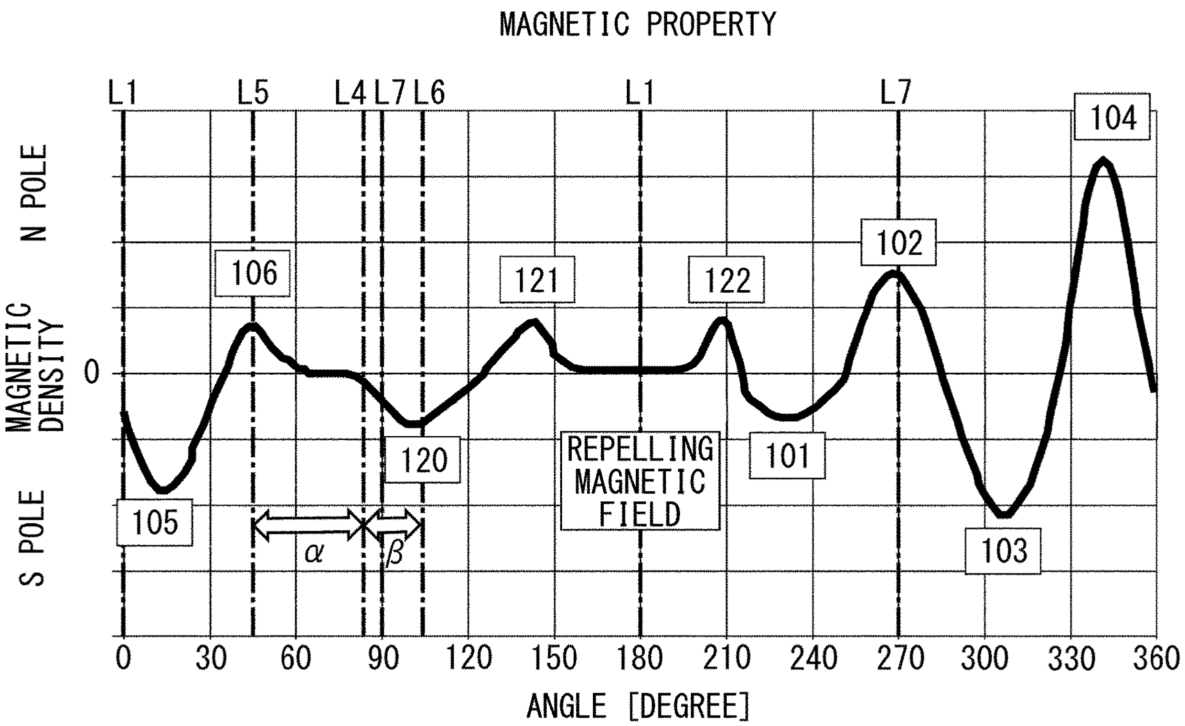
FIG. 15 is a graph showing a magnetic property of the first developing roller in the third embodiment.

In the first magnet 36C in this embodiment, as shown in FIG. 14, at the position of the magnetic pole 107 employed in the first embodiment, a magnetic pole 120 is newly provided, and a magnetic pole 121 is provided adjacent to the magnetic pole 120. That is, the first magnet 36C includes the magnetic pole 121 as a fourth magnetic pole different in polarity from the magnetic pole 120 at a position downstream of and adjacent to the magnetic pole 120 as the second magnetic pole with respect to the rotational direction of the first sleeve 33.

Further, the first magnet 36 is newly provided with a magnetic pole 122 on a side downstream of the magnetic pole 121 with respect to the rotational direction of the first sleeve 33. That is, the first magnet 36C includes the magnetic pole 122 as a fifth magnetic pole having the same polarity as the magnetic pole 121, positioned downstream of the magnetic pole 121 with respect to the rotational direction of the first sleeve 33 and below the horizontal line L1 passing through the rotation center Q of the first sleeve 33 in the vertical direction.

Here, the magnetic pole 121 is positioned above the horizontal line L1 passing through the rotation center Q of the first developing roller 30, and the magnetic pole 122 is positioned below the horizontal line L1. Further, the magnetic pole 122 is adjacent to the magnetic pole 121 via a repelling magnetic field region 110 and is an N pole having the same polarity as the magnetic pole 121. Further, a repelling magnetic field generated between the magnetic pole 121 and the magnetic pole 122 is caused to exist on the horizontal line L1 or on a side downstream of the horizontal line L1 with respect to the rotational direction of the first sleeve 33. A magnetic property distribution of such a first magnet 36C is shown in FIG. 15.

Further, in the case of this embodiment, the point Z becomes a peak position of the magnetic flux density of the magnetic pole 120 in the normal direction relative to the surface of the first sleeve 33. Further, also, in the case of this embodiment, the rectilinear line connecting the rotation center Q and the point X is the rectilinear line L4, the rectilinear line connecting the rotation center Q and the point Y is the rectilinear line L5, the rectilinear line connecting the rotation center Q and the point Z is the rectilinear line L6, the angle (acute angle) formed between the rectilinear lines L4 and L5 is α, and the angle (acute angle) formed between the rectilinear lines L4 and L6 is β. In this case, as regards the positional relationship between the magnetic poles 106 and 120, these magnetic poles are disposed at positions satisfying α>β similarly as in the first embodiment. Further, in this embodiment, similarly as in the first embodiment, it is preferable that the relationship of 35°≤α≤45° is further satisfied.

Further, in this embodiment, similarly as in the first embodiment, with respect to the rotational direction of the first sleeve 33, the point Z is on the side downstream of the point X. This is because the magnetic pole 107 in the first magnet 36 and the magnetic pole 120 in the first magnet 36 are in a different magnetic pole relationship, and therefore, in the case where the point Z is positioned on the same position as the point X with respect to the rotational direction of the first sleeve 33 and in the case where the point Z is positioned on a side upstream of the point X with respect to the rotational direction of the first sleeve 33, a delivering magnetic field is generated between the magnetic pole 106 in the first magnet 36 and the magnetic pole 120 in the first magnet 36. As a result, with respect to the rotational direction of the first sleeve 33, in the case where the point Z is positioned in the same position as the point X and in the case where the point Z is positioned on the side upstream of the point X, in the neighborhood of the first sleeve 33, there is a liability that in the neighborhood of the closest position between the first developing roller 30 and the second developing roller 31, delivering efficiency of the developer by the magnetic field generated by the cooperation between the magnetic pole 106 of the first developing roller 30 and the magnetic pole 201 of the second developing roller 31 lowers. Therefore, in this embodiment, with respect to the rotational direction of the first sleeve 33, the point Z is positioned on the side downstream of the point X, so that in the neighborhood of the closest position between the first developing roller 30 and the second developing roller 31, the developer is made easy to be delivered by the magnetic field generated by the cooperation between the magnetic pole 106 of the first developing roller 30 and the magnetic pole 201 of the second developing roller 31.

Also, in such a case of this embodiment, it becomes possible to suppress not only that from the first developing roller 30 to the second developing roller 31 positioned above the first developing roller, the used developer peeled off from the second developing roller 31 is conveyed to the delivering portion between the first developing roller 30 and the second developing roller 31 in the neighborhood of the closest position between the first developing roller 30 and the second developing roller 31 but also the drag of the used developer by the second developing roller 31. Further, also, in the case of this embodiment, similarly as in the second embodiment, the peeling-off of the developer from the first sleeve 33 becomes easy in a region of a component lower than the horizontal line L of the rotation center Q of the first developing roller 30 in the direction of gravity.

Fourth Embodiment

A fourth embodiment will be described using FIGS. 16 and 17. This embodiment is different from the first embodiment in constitution of magnetic poles of a first magnet 36D of a first developing roller 30. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 16:
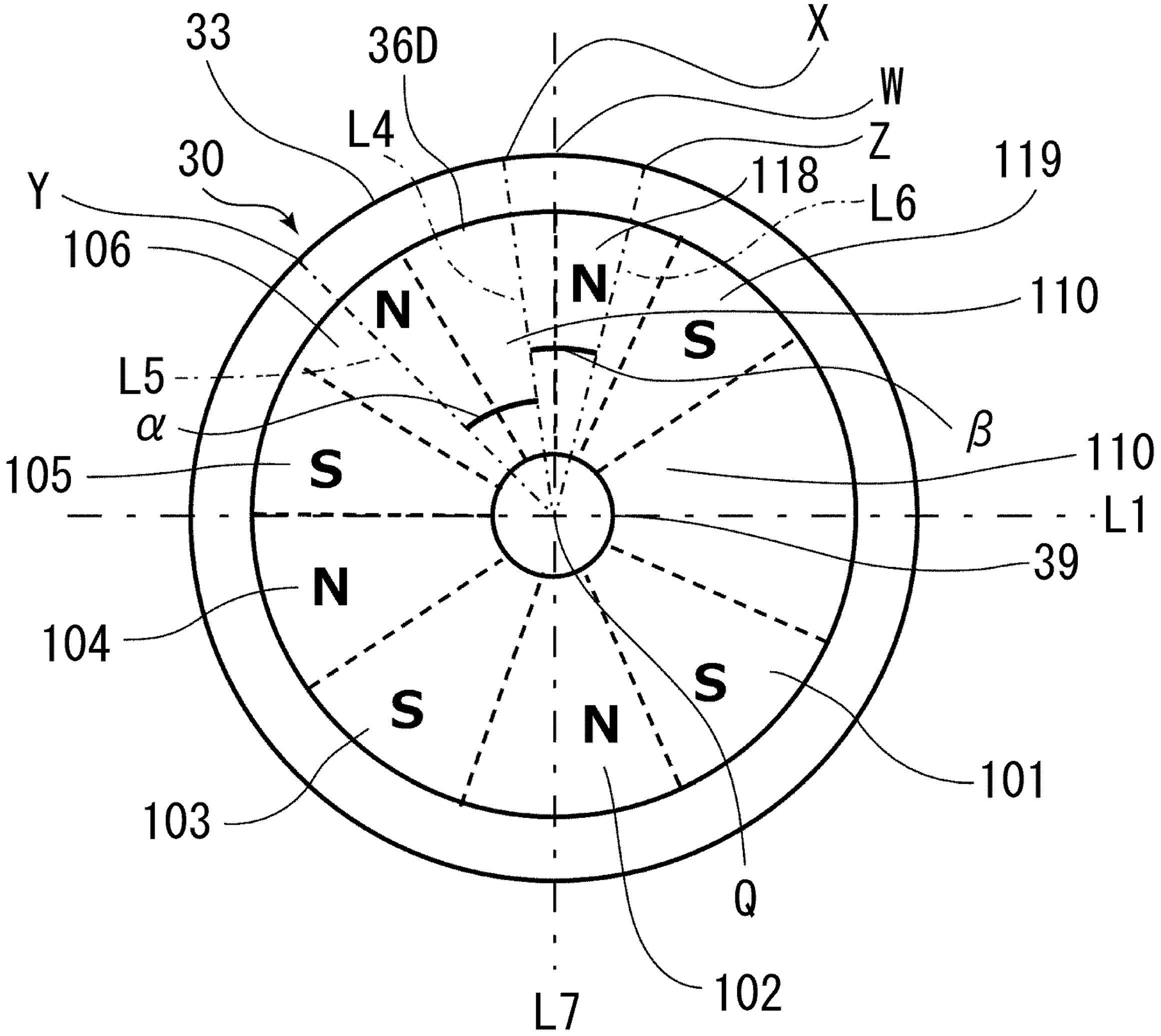
FIG. 16 is a schematic view showing a magnetic arrangement of a first developing roller in a fourth embodiment.
Figure 17:
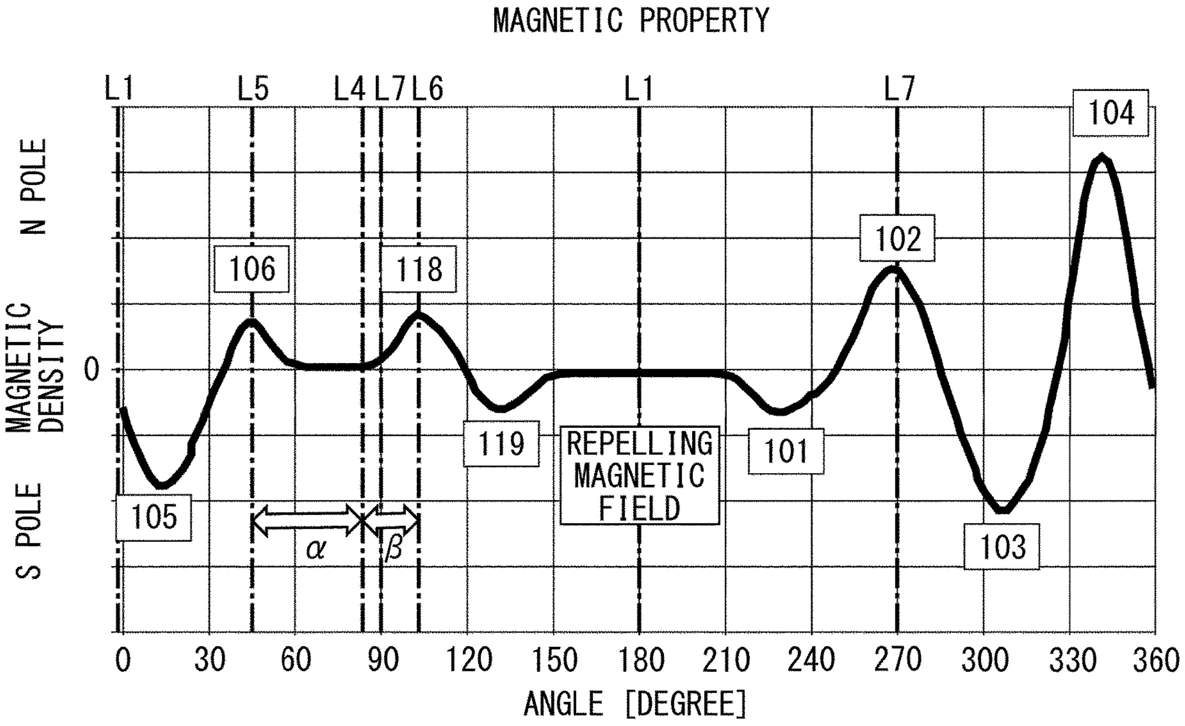
FIG. 17 is a graph showing a magnetic property of the first developing roller in the fourth embodiment.

In the first magnet 36D in this embodiment, as shown in FIG. 16, at the position of the magnetic pole 107 which is a receiving pole employed in the first embodiment, magnetic poles 118 and 119 are newly provided as receiving poles. That is, the first magnet 36D is provided with the magnetic pole 119 different in polarity from the magnetic pole 118 at a position downstream of and adjacent to the magnetic pole 118 as a second magnetic pole with respect to the rotational direction of the rotational direction of the first sleeve 33.

Here, the magnetic pole 118 is an N pole having the same polarity as the magnetic pole 106, and the magnetic pole 119 is an S pole having the same polarity as the magnetic pole 101. That is, the first magnet 36D includes the magnetic pole 101 having the same polarity as the magnetic pole 119 at a position downstream of the magnetic pole 119 with respect to the rotational direction of the first sleeve 33 and below the horizontal line L1 passing through the rotation center Q of the first sleeve 33 in the vertical direction. The magnetic pole 101 is adjacent to the magnetic pole 119 via a repelling magnetic field region 110, and corresponds to a fifth magnetic pole in this embodiment.

Further, the repelling magnetic field generated between the magnetic pole 119 and the magnetic pole 101 is caused to exist on the horizontal line L1 or on a side downstream of the horizontal line L1 with respect to the rotational direction of the first sleeve 33. That is, in this embodiment, the magnetic poles 118 and 119 are positioned above the horizontal line L1 passing through the rotation center Q of the first developing roller 30, so that a constitution in which a repelling magnetic field exists on the horizontal line L1 and on a side downstream of the horizontal line L1 with respect to the rotational direction of the first sleeve 33 by the adjacent magnetic poles 119 and 101 via the repelling magnetic field region 110. A magnetic property distribution of such a first magnet 36D is shown in FIG. 17.

Further, in the case of this embodiment, the point Z becomes a peak position of the magnetic flux density of the magnetic pole 118 in the normal direction relative to the surface of the first sleeve 33. Further, also, in the case of this embodiment, the rectilinear line connecting the rotation center Q and the point X is the rectilinear line L4, the rectilinear line connecting the rotation center Q and the point Y is the rectilinear line L5, the rectilinear line connecting the rotation center Q and the point Z is the rectilinear line L6, the angle (acute angle) formed between the rectilinear lines L4 and L5 is $\alpha$, and the angle (acute angle) formed between the rectilinear lines L4 and L6 is $\beta$. In this case, as regards the positional relationship between the magnetic poles 106 and 118, these magnetic poles are disposed at positions satisfying $\alpha>\beta$ similarly as in the first embodiment. Further, in this embodiment, similarly as in the first embodiment, it is preferable that the relationship of $35°\leq\alpha\leq45°$ is further satisfied.

At this time, the magnetic pole 106 and the magnetic pole 118 have the same polarity as described above, and therefore, a repelling magnetic field is generated between the magnetic poles 106 and 118, so that the developer dropped to the neighborhood of the first sleeve 33 is liable to be influenced by the magnetic field of the magnetic pole 118 and thus is deposited in the neighborhood of the point Z which is a magnetic flux density peak position.

As described above, in this embodiment, with respect to the rotational direction of the first sleeve 33, the point Z is on the side downstream of the point X. This is because the magnetic pole 118 of the first developing roller 30 and the magnetic pole 201 of the second developing roller 31 are in a different magnetic pole relationship, and therefore, in the case where the point Z is positioned on the same position as the point X with respect to the rotational direction of the first sleeve 33 and in the case where the point Z is positioned on a side upstream of the point X with respect to the rotational direction of the first sleeve 33, a delivering magnetic field is generated between the magnetic pole 118 of the first developing roller 30 and the magnetic pole 201 of the second developing roller 31. As a result, with respect to the rotational direction of the first sleeve 33, in the case where the point Z is positioned in the same position as the point X and in the case where the point Z is positioned on the side upstream of the point X, in the neighborhood of the first sleeve 33, the used developer dropped from the point P on the second sleeve 34 is not readily adsorbed in the direction of the magnetic pole 118 of the first developing roller 30. Therefore, in this embodiment, with respect to the rotational direction of the first sleeve 33, the point Z is positioned on the side downstream of the point X, so that the used developer dropped from the point P on the second sleeve 34 is made liable to be adsorbed in the direction of the magnetic pole 118 of the first developing roller 30 in the neighborhood of the first sleeve 33.

Also, in such a case of this embodiment, it becomes possible to suppress not only that from the first developing roller 30 to the second developing roller 31 positioned above the first developing roller, the used developer peeled off from the second developing roller 31 is conveyed to the delivering portion between the first developing roller 30 and the second developing roller 31 in the neighborhood of the closest position between the first developing roller 30 and the second developing roller 31 but also the drag of the used developer by the second developing roller 31. Further, also, in the case of this embodiment, similarly as in the second embodiment, peeling-off of the developer from the first sleeve 33 becomes easy to be made in a region of a component lower than the horizontal line L1 of the rotation center Q of the first developing roller 30 in the direction of gravity.

Other Embodiments

The present invention is not limited to the constitution of the above-described embodiment. For example, the image forming apparatus 100 is not limited to the MFP, but may also be a copying machine, a printer, or a facsimile machine. Further, the constitutions of the developer supplying screw 42, the developer stirring screw 43, and the developer collecting screw 44 are not particularly limited when the constitutions can convey the developer, and for example, it is possible to apply a helical blade, a paddle-like blade.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-020079 filed on Feb. 13, 2023 and 2024-003032 filed on Jan. 12, 2024, which are hereby incorporated by reference herein in their entirety.

What is claimed is:

1. A developing device comprising:

a first chamber configured to accommodate a developer containing toner and a carrier;

a first feeding screw provided in the first chamber and configured to feed the developer in the first chamber;

a first rotatable member to which the developer is supplied from the first chamber and configured to carry and feed the developer for developing an electrostatic latent image formed on an image bearing member;

a first magnet fixedly provided inside the first rotatable member and including a first magnetic pole and a second magnetic pole which is provided downstream of and adjacent to the first magnetic pole in a rotational direction of the first rotatable member and which has the same polarity as the first magnetic pole;

a second rotatable member which is provided opposed to the first rotatable member, to which the developer is delivered from the first rotatable member by a magnetic field generated by the first magnet, and which is configured to carry and feed the developer for developing the electrostatic latent image, the second rotatable member having a rotation center R positioned above a rotation center Q of the first rotatable member in a vertical direction;

a second magnet fixedly provided inside the second rotatable member and including a third magnetic pole which is provided opposed to the first magnetic pole and which is different in polarity from the first magnetic pole;

a second chamber which is partitioned from the first chamber by a partition wall and in which the developer after the electrostatic latent image is developed with the developer is collected; and a second feeding screw provided in the second chamber and configured to feed the developer in the second chamber, the second feeding screw having a rotation center positioned above a rotation center of the first feeding screw in the vertical direction, wherein in a case that a point where a horizontal line L2 passing through the rotation center R of the second rotatable member and an outer peripheral surface of the second rotatable member intersect with each other and which is positioned on a side opposite from the image bearing member with respect to the rotation center R of the second rotatable member is a point P, a point where a vertical line passing through the point P and an outer peripheral surface of the first rotatable member intersect with each other and which is positioned above the rotation center Q of the first rotatable member in the vertical direction is a point X, a position where a magnetic flux density of the first magnetic pole in the normal direction relative to the outer peripheral surface of the first rotatable member becomes a peak is a point Y, and a position where a magnetic flux density of the second magnetic pole in the normal direction relative to the outer peripheral surface of the first rotatable member becomes a peak is a point Z, the point X is positioned downstream of the point Y and upstream of the point Z in the rotational direction of the first rotatable member, and wherein in a case that a rectilinear line connecting the rotation center Q of the first rotatable member and the point X is a rectilinear line L4, a rectilinear line connecting the rotation center Q of the first rotatable member and the point Y is a rectilinear line L5, a rectilinear line connecting the rotation center Q of the first rotatable member and the point Z is a rectilinear line L6, an acute angle formed between the rectilinear lines L4 and L5 is $\alpha$ [°], and an acute angle formed between the rectilinear lines L4 and L6 is $\beta$ [°], $\alpha>\beta$ is satisfied.

2. A developing device according to claim 1, wherein in a case that a point where a vertical line L7 passing through the rotation center Q of the first rotatable member and the outer peripheral surface of the first rotatable member intersect with each other and which is positioned above the rotation center Q of the first rotatable member in the vertical direction is a point W, the point W is positioned downstream of the point Y and upstream of the point Z in the rotational direction of the first rotatable member.

3. A developing device according to claim 1, wherein the second magnet includes a fourth magnetic pole which is provided upstream of and adjacent to the third magnetic pole in a rotational direction of the second rotatable member and which has the same polarity as the third magnetic pole, and wherein the point P is positioned downstream of the fourth magnetic pole and upstream of the third magnetic pole in the rotational direction of the second rotatable member.

4. A developing device according to claim 3, further comprising:

a third rotatable member which is provided opposed to the second rotatable member, to which the developer is delivered from the second rotatable member by a magnetic field generated by the second magnet, and which is configured to carry and feed the developer for collecting, in the second chamber, the developer after the electrostatic latent image is developed with the developer by the second rotatable member, the third rotatable member having a rotation center positioned above the rotation center R of the second rotatable member in the vertical direction;

a third magnet fixedly provided inside the third rotatable member and including a fifth magnetic pole which is provided opposed to the fourth magnetic pole and which is different in polarity from the fourth magnetic pole.

5. A developing device according to claim 4, further comprising a guiding portion provided opposed to each of the second rotatable member and the third rotatable member and configured to guide the developer, to the second feeding screw, peeled off from the third rotatable member by a repelling magnetic field generated by the third magnet.

6. A developing device according to claim 1, wherein the following relationship is satisfied:

$$35° \leq \alpha \leq 45°.$$

7. A developing device according to claim 1, further comprising a communicating portion configured to permit communication of the developer from the second chamber to the first chamber.

8. A developing device according to claim 1, further comprising:

a third chamber partitioned from the first chamber by another partition wall different from the partition wall;

a third feeding screw provided in the third chamber and configured to feed the developer in the third chamber;

a first communicating portion configured to permit communication of the developer from the third chamber to the first chamber; and a second communicating portion configured to permit communication of the developer from the first chamber to the third chamber.

9. A developing device according to claim 1, wherein in a position where the first rotatable member and the second rotatable member oppose to each other, the second rotatable member rotates in a direction opposite to the rotational direction of the first rotatable member.

* * * * *